US010192129B2

(12) United States Patent
Price et al.

(10) Patent No.: US 10,192,129 B2
(45) Date of Patent: Jan. 29, 2019

(54) UTILIZING INTERACTIVE DEEP LEARNING TO SELECT OBJECTS IN DIGITAL VISUAL MEDIA

(71) Applicant: Adobe Systems Incorporated, San Jose, CA (US)

(72) Inventors: Brian Price, San Jose, CA (US); Scott Cohen, Sunnyvale, CA (US); Ning Xu, Urbana, IL (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 259 days.

(21) Appl. No.: 14/945,245

(22) Filed: Nov. 18, 2015

(65) Prior Publication Data
US 2017/0140236 A1     May 18, 2017

(51) Int. Cl.
*G06K 9/32* (2006.01)
*G06K 9/46* (2006.01)
*G06K 9/36* (2006.01)

(52) U.S. Cl.
CPC ......... *G06K 9/3241* (2013.01); *G06K 9/4628* (2013.01); *G06K 2009/366* (2013.01)

(58) Field of Classification Search
None
See application file for complete search history.

(56) References Cited

U.S. PATENT DOCUMENTS

| | | | | |
|---|---|---|---|---|
| 7,295,700 | B2 * | 11/2007 | Schiller | G06K 9/342 382/159 |
| 2004/0202368 | A1 * | 10/2004 | Lee | G06K 9/00624 382/173 |
| 2014/0010449 | A1 * | 1/2014 | Haaramo | G06T 19/00 382/173 |
| 2016/0232425 | A1 * | 8/2016 | Huang | G06T 7/0012 |
| 2017/0032551 | A1 * | 2/2017 | Fried | G06T 11/60 |
| 2017/0169567 | A1 * | 6/2017 | Chefd'hotel | G06K 9/00127 |

OTHER PUBLICATIONS

Roth, H.—"DeepOrgan: Multi-level Deep Convolutional Networks for Automated Pancreas Segmentation"—Jun. 22, 2015—arXiv:1506.06448v1, pp. 1-12.*
Wang, N.—"Transferring Rich Feature Hierarchies for Robust Visual Tracking"—Apr. 23, 2015—arXiv:1501.04587v2, pp. 1-9.*
Farag, A.—"A Bottom-up Approach for Pancreas Segmentation using Cascaded Superpixels and (Deep) Image Patch Labeling"—May 22, 2015—Elsevier Journal of Medical Image Analysis, pp. 1-21.*

(Continued)

*Primary Examiner* — Bernard Krasnic
(74) *Attorney, Agent, or Firm* — Keller Jolley Preece

(57) ABSTRACT

Systems and methods are disclosed for selecting target objects within digital images. In particular, in one or more embodiments, the disclosed systems and methods generate a trained neural network based on training digital images and training indicators. Moreover, one or more embodiments of the disclosed systems and methods utilize a trained neural network and iterative user indicators to select targeted objects in digital images. Specifically, the disclosed systems and methods can transform user indicators into distance maps that can be utilized in conjunction with color channels and a trained neural network to identify pixels that reflect the target object.

20 Claims, 19 Drawing Sheets

(56) References Cited

OTHER PUBLICATIONS

X. Bai and G. Sapiro. Geodesic matting: A framework for fast interactive image and video segmentation and matting. International Journal of Computer Vision, 82(2):113-132, 2009.

Y. Y. Boykov and M.-P. Jolly. Interactive graph cuts for optimal, boundary & region segmentation of objects in n-d images. In Computer Vision, 2001. ICCV 2001. Proceedings. Eighth IEEE International Conference on, vol. 1, pp. 105-112. IEEE, 2001.

L.-C. Chen, G. Papandreou, I. Kokkinos, K. Murphy, and A. L. Yuille. Semantic image segmentation with deep convolutional nets and fully connected crfs. arXiv preprint arXiv:1412.7062, 2014.

R. Girshick, J. Donahue, T. Darrell, and J. Malik. Rich feature hierarchies for accurate object detection and semantic segmentation. In Computer Vision and Pattern Recognition (CVPR), 2014 IEEE Conference on, pp. 580-587. IEEE, 2014.

L. Grady. Random walks for image segmentation. Pattern Analysis and Machine Intelligence, IEEE Transactions on, 28(11):1768-1783, 2006.

V. Gulshan, C. Rother, A. Criminisi, A. Blake, and A. Zisserman. Geodesic star convexity for interactive image segmentation. In Computer Vision and Pattern Recognition (CVPR), 2010 IEEE Conference on, pp. 3129-3136. IEEE, 2010.

G. Lin, C. Shen, I. Reid, et al. Efficient piecewise training of deep structured models for semantic segmentation. arXiv preprint arXiv:1504.01013, 2015.

Z. Liu, X. Li, P. Luo, C. C. Loy, and X. Tang. Semantic image segmentation via deep parsing network. arXiv preprint arXiv:1509.02634, 2015.

J. Long, E. Shelhamer, and T. Darrell. Fully convolutional networks for semantic segmentation. arXiv preprint arXiv:1411.4038, 2014.

B. L. Price, B. Morse, and S. Cohen. Geodesic graph cut for interactive image segmentation. In Computer Vision and Pattern Recognition (CVPR), 2010 IEEE Conference on, pp. 3161-3168. IEEE, 2010.

C. Rother, V. Kolmogorov, and A. Blake. Grabcut: Interactive foreground extraction using iterated graph cuts. ACM Transactions on Graphics (TOG), 23(3):309-314, 2004.

S. Zheng, S. Jayasumana, B. Romera-Paredes, V. Vineet, Z. Su, D. Du, C. Huang, and P. Torr. Conditional random fields as recurrent neural networks. arXiv preprint arXiv: 1502.03240, 2015.

* cited by examiner

UTILIZING INTERACTIVE DEEP LEARNING TO SELECT OBJECTS IN DIGITAL VISUAL MEDIA

BACKGROUND

1. Technical Field

One or more embodiments of the present disclosure relate generally to selecting objects in digital visual media. More specifically, one or more embodiments of the present disclosure relate to systems and methods that select objects in digital visual media utilizing interactive deep learning.

2. Background and Relevant Art

Recent years have seen a rapid proliferation in the use of digital visual media. Indeed, with advancements in digital cameras, smartphones, and other technology, the ability to capture, access, and utilize images and video has steadily increased. For instance, businesses now routinely utilize digital visual media for presentations, advertising, recruiting, merchandising, and other purposes. Similarly, individuals now routinely utilize digital visual media for communication, entertainment, or employment purposes.

With the increased propagation of digital visual media has come an increased need for systems that can quickly and efficiently edit and modify digital visual media. For example, consumers now routinely capture digital images and seek to digitally modify the features or objects represented in the digital images. For instance, users seek to select objects represented in digital images to move, modify, copy, paste, or resize the selected objects.

In response to this user demand, some digital object selection systems have been developed that permit a user to identify and select objects within digital images. Although these systems permit users to identify and select some digital objects in digital images, these systems have numerous problems and shortcomings.

For example, some common digital object selection systems permit a user to trace an area within a digital image and select pixels within the traced area. Although such systems allow a user to select pixels in a digital image, they are often rough, over-inclusive, under-inclusive, and/or time consuming. Indeed, systems that rely upon manual tracing by a user commonly fail to provide sufficient precision to accurately select objects. Moreover, in order to increase accuracy, users often spend an exorbitant amount of time attempting to trace an object in a digital image.

Similarly, some common digital object selection systems are trained to identify pixels corresponding to common object classes. For example, some common digital systems are trained to identify and select pixels corresponding to dogs, cats, or other object classes. Although such systems are capable of identifying and selecting common objects, they are limited by the particular classifications with which they are trained. Because the number and type of object classes in the world is so vast, such common digital object selection systems can severely limit a user's ability to identify, select, and modify objects in digital visual media. Moreover, because such common systems identify pixels corresponding to a particular object type, they often have difficulty distinguishing between multiple objects belonging to the same class.

These and other problems exist with regard to identifying objects in digital visual media.

BRIEF SUMMARY

Introduced here are techniques/technology that identify objects utilizing interactive deep learning techniques. In particular, in one or more embodiments, systems and methods utilize deep learning techniques in conjunction with interactive user input to select objects within digital visual media. For instance, one or more embodiments include systems and methods that train a neural network based on generic training images and training indicators. Based on this training, the systems and methods utilize the neural network to identify one or more objects based on user interactions. In particular, by utilizing a trained neural network, in one or more embodiments, systems and methods selects an object in a digital image based on a simple click corresponding to the object.

In one or more embodiments, the systems and methods identify a user indicator with regard to a probe digital image. Specifically, in one or more embodiments, the user indicator comprises one or more indicated pixels of the probe digital image and an indication of how the one or more indicated pixels correspond to a target object represented in the probe digital image. In addition, systems and methods can utilize the trained neural network and the user indicator to identify a set of pixels representing the target object in the probe digital image. By utilizing deep learning methods in conjunction with interactive user input of user indicators, the disclosed systems and methods identify a set of pixels representing target objects quickly and accurately. Indeed, in one or more embodiments, the systems and methods can accurately select a target object with minimal user input, often times with only a single click.

Moreover, by identifying pixels representing a target object utilizing a generically trained neural network, the disclosed systems and methods can identify any type, variety, number, or portion of objects represented in digital visual media. For example, in one or more embodiments, the systems and methods can identify and select random, unusual objects or sub-portions of objects. Similarly, in one or more embodiments, the systems and methods can distinguish between two objects contained within the same digital image even though the two objects belong to the same object class.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1A:
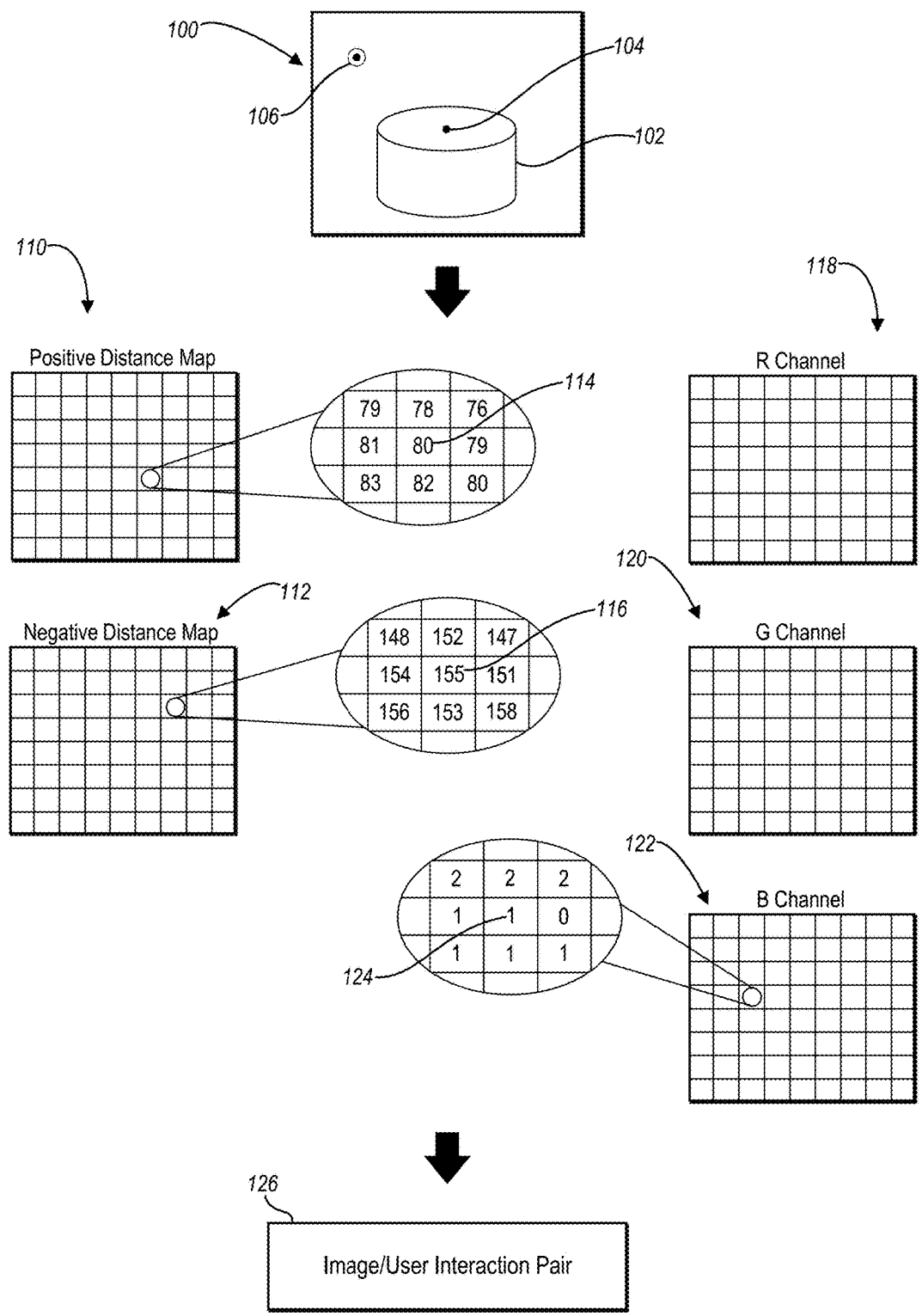
FIG. 1A illustrates a representation of generating input data for a neural network from a digital image in accordance with one or more embodiments.

One or more embodiments of the present disclosure include a digital selection system that identifies digital objects in digital visual media. More particularly, the digital selection system identifies digital objects utilizing interactive deep learning techniques. For example, in one or more embodiments, the digital selection system trains a neural network utilizing digital training images and training indicators. Moreover, in one or more embodiments, the digital selection system utilizes the trained neural network to select an object within an image based on user input.

For instance, in one or more embodiments, the digital selection system trains a neural network utilizing a repository of digital training images with selected objects and inputs that indicate points that are either within the selected objects or outside of the selected objects. Using the training images, selected objects, and the inputs, the digital selection system trains the neural network to select objects in digital visual media with minimal user interaction.

More particularly regarding selection of objects, in one or more embodiments the digital selection system identifies user input that indicate points that are either inside or outside of an object the user desires to be selected. For instance, the user inputs can include one or more pixels of the digital image and an indication of how the one or more pixels correspond to an object represented in the probe digital image. Furthermore, in one or more embodiments, the digital selection system utilizes the trained neural network and the user input to identify a set of pixels representing the object in the digital image.

By utilizing a trained neural network in conjunction with user input, in one or more embodiments, the digital selection system has the ability to select any variety, number, or type of objects represented in a probe digital image. In particular, in one or more embodiments, the digital selection system trains a neural network with generic target objects (i.e., unsupervised target objects) and a plurality of training inputs. Accordingly, when presented with a probe digital image, the trained neural network can identify and select any type of object, regardless of object type or class. As used herein, the term "select" when used in conjunction with a target object refers to identifying pixels that represent the target object. The term "select" includes identifying a set of all pixels that make up a target object in digital visual media. For instance, the term "select" includes generating an object boundary that encompasses pixels that represent a target object (i.e., an object boundary that comprises a shape, element, or collection of pixels that encompass a target object). Similarly, the term "select" includes generating a mask that identifies the pixels representing a target object.

Moreover, by leveraging deep learning techniques, the digital selection system identifies target objects in digital visual media while simplifying and reducing user interaction. For instance, in many circumstances, the digital selection system accurately selects a target object represented in a probe digital image based on one or two clicks from a user. Thus, the digital selection system significantly reduces the time and effort required by users to accurately select target objects portrayed in probe digital images.

In one or more embodiments, the digital selection system identifies target objects in probe digital images by transforming user inputs into distance maps. As discussed in greater detail below, a distance map reflects distances between pixels in digital images and one or more indicated pixels. Thus, in one or more embodiments, the digital selection system transforms user indicators (i.e., the user inputs) in a digital image (e.g., positive or negative clicks corresponding to a target object in a digital image) into distance maps.

The digital selection system utilizes distance maps to identify an object in a digital image. For instance, in one or more embodiments, the digital selection system provides distance maps and a corresponding digital image to a trained neural network. More specifically, the digital selection system combines distance maps with color channels (i.e., data sets reflecting the color of pixels in digital images) to form image/user interaction pairs (i.e., a data set pair combining image data reflected by color channels for a particular digital image together with user interaction data reflected by distance maps for the particular digital image). The digital selection system trains a neural network using the image/user interaction pairs.

The digital selection system utilizes the trained neural network to select a target object based on the image/user interaction pairs. Specifically, the digital selection system utilizes a trained neural network and image/user interaction pairs to generate a probability map. In particular, the digital selection system generates a probability map that reflects the likelihood that pixels within a probe digital image are part of a target object in the probe digital image. Utilizing the probability map (e.g., in combination with a graph cut algorithm, a probability threshold, or other tool), the digital selection system identifies pixels representing the target object in the probe digital image. In this manner, the digital selection system identifies and selects one or more target objects in a probe digital image.

As used herein, the term "neural network" refers to a machine learning model that can be tuned (e.g., trained) based on inputs to approximate unknown functions. In particular, the term "neural network" can include a model of interconnected neurons that communicate and learn to approximate complex functions and generate outputs based on a plurality of inputs provided to the model. For instance, the term "neural network" includes one or more machine learning algorithms. In particular, the term "neural network" includes deep convolutional neural networks (i.e., "CNNs") and fully convolutional neural networks (i.e., "FCNs"). In other words, a neural network is an algorithm that implements deep learning techniques, i.e., machine learning that utilizes a set of algorithms to attempt to model high-level abstractions in data.

Aside from utilizing a trained neural network to select target objects, in one or more embodiments, the digital selection system also generates a trained neural network. In particular, in one or more embodiments, the digital selection system generates training image/user interaction pairs and trains or refines the training of a neural network utilizing the training image/user interaction pairs. Moreover, in one or more embodiments, the digital selection system utilizes user interaction with digital images as additional training data to further improve the trained neural network.

More specifically, in one or more embodiments, the digital selection system accesses a repository of digital training images wherein the digital training images portray identified target objects defined by training object data (e.g., object boundaries or ground truth masks). The digital selection system utilizes random sampling strategies to model user input patterns with regard to the training objects in digital training images. Moreover, based on the random sampling strategies, the digital selection system generates training distance maps and training image/user interaction pairs.

Upon creating a plurality of training image/user interaction pairs, the digital selection system utilizes the training image/user interaction pairs to generate a trained neural network. In particular, the digital selection system can provide the training image/user interaction pairs to a neural network together with training object data (e.g., known ground truth masks corresponding to target objects). Based on the training image/user interaction pairs and training object data (e.g., an identified target object), the neural network learns to identify generic objects based on one or more training indicators. In particular, the neural network learns the appearance and shapes of targeted objects as well as how user input (i.e. user input of user indicators) corresponds to the targeted object.

The digital selection system also utilizes a trained neural network to identify and select objects through iterative interactions with a user. For instance, in one or more embodiments, the digital selection system receives user input, provides feedback to a user, and allows for additional input until the user obtains an acceptable result. In this manner, one or more embodiments of the digital selection system generate and modify object boundaries based on iterative user input of user indicators.

The digital selection system identifies and selects target objects with regard to any type of digital visual media. For instance, in addition to identifying objects in digital images, the digital selection system can also identify objects portrayed in multiple images/frames in a digital video. Indeed, in one or more embodiments, the digital selection system utilizes a trained neural network and user input to identify an object boundary or mask in a first image/frame of a digital video. Moreover, the digital selection system then utilizes the object boundary or mask, in conjunction with the trained neural network, to identify the object as portrayed in one or more subsequent digital images/frames in the digital video.

As just mentioned, the digital selection system can utilize a trained neural network to select a target object within a probe digital image based on user indicators, and the digital selection system can train a neural network utilizing training indicators and training digital images. Additional detail will now be provided through illustrative figures regarding the process of using and generating a trained neural network to select a target object. First, with regard to FIGS. 1A-1C, embodiments will be described for utilizing a trained neural network to select a target object in a probe digital image from user indicators. Thereafter, with regard to FIGS. 2A-4, embodiments will be discussed for generating a trained neural network utilizing a repository of digital images and training indicators.

Figure 1B:
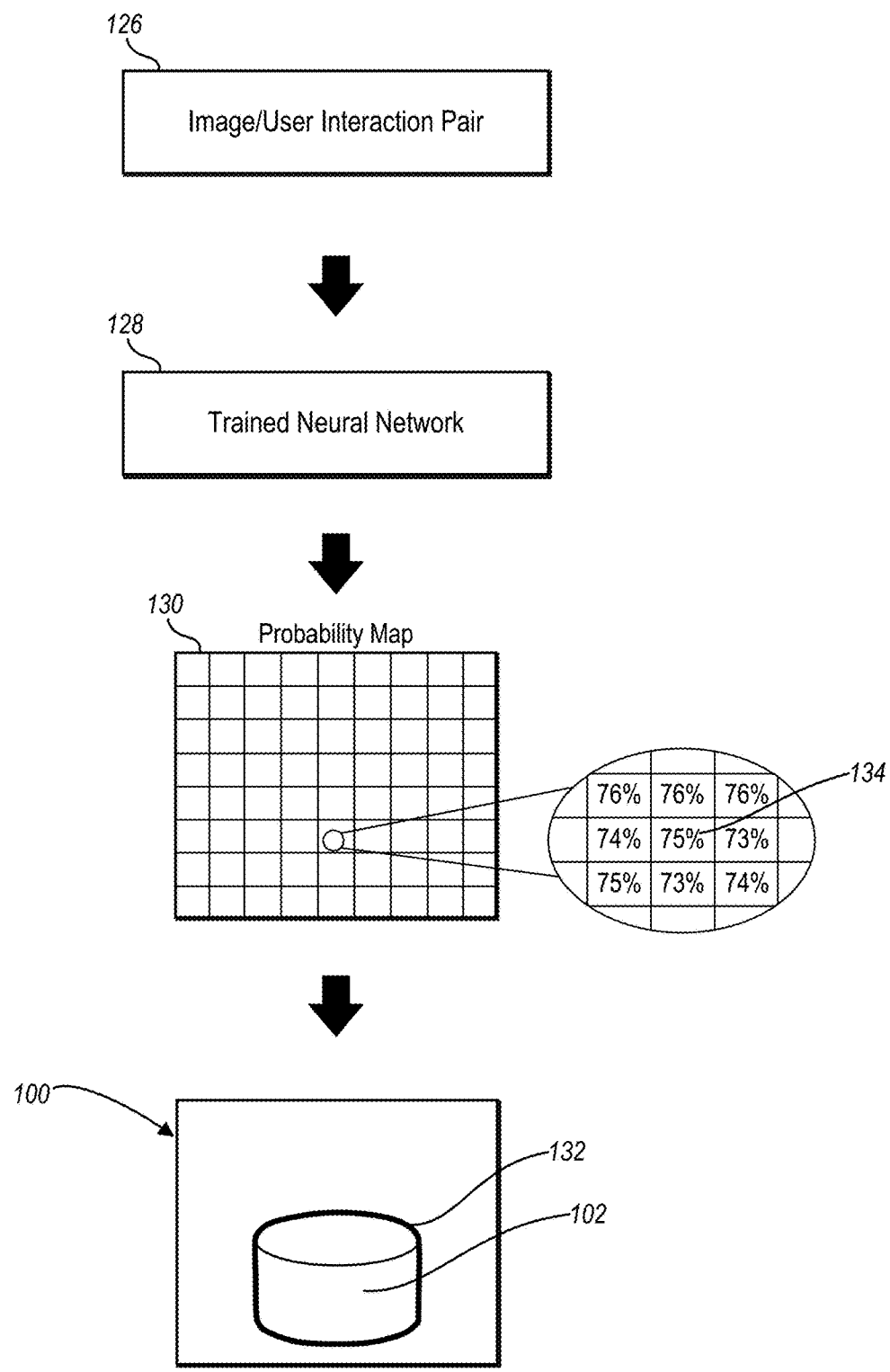
FIG. 1B illustrates a representation of selecting a target object in a digital image based on input data for a neural network in accordance with one or more embodiments.

Thus, as just mentioned, FIGS. 1A-1B, illustrate selecting objects in digital images utilizing a trained neural network in accordance with one or more embodiments. In particular, FIG. 1A illustrates an instance of digital visual media (i.e., digital image 100) portraying a target object 102. As used herein, the term "digital visual media" refers to any digital item capable of producing a visual representation. For instance, the term "digital visual media" includes digital images and digital video. As used herein, the term "digital image" refers to any digital symbol, picture, icon, or illustration. For example, the term "digital image" includes digital files with the following file extensions: JPG, TIFF, BMP, PNG, RAW, or PDF. Similarly, as used herein, the term "digital video" refers to a digital sequence of images. For example, the term "digital video" includes digital files with the following file extensions: FLV, GIF, MOV, QT, AVI, WMV, MP4, MPG, MPEG, or M4V. Moreover, as used herein the term, "probe digital image" refers to a digital image containing a target object that a user seeks to select.

As used herein, the term "target object" refers to an object reflected in digital visual media that is sought to be identified. For instance, the term "target object" includes an object reflected in a digital training image, where a neural network is trained by attempting to identify the object. Similarly, the term "target object" includes an object reflected in a digital image that a user seeks to identify or select. Accordingly, an "untargeted object" refers to an object reflected in digital visual media that is not sought to be identified or selected. Thus, for example, an "untargeted object" includes a background object that a neural network or a user does not seek to identify. Moreover, as used herein, the term "generic target objects" refers to unsupervised target objects (i.e., objects that are not identified as belonging to a particular object class or type).

Returning again to the Figures, FIG. 1A also illustrates user indicators 104, 106 (i.e., clicks). In particular, FIG. 1A illustrates positive user indicator 104 with regard to a first pixel of the digital image 100 and a negative user indicator 106 with regard to a second pixel of the digital image 100. As used herein, a "positive user indicator" is user input (e.g., a click) on the target object. A "negative user indicator" is user input (e.g., a click) not on the target object. Thus, FIG. 1A shows that the positive user indicator 104 is located within the target object 102, while the negative user indicator 106 is not located within the target object 102.

With regard to the embodiment of FIG. 1A, the digital selection system identifies the user indicators 104, 106 via user input. In particular, the digital selection system receives user input indicating the positive user indicator 104 and user input indicating the negative user indicator 106. For example, the digital selection system can recognize a first type of user input as a positive user indicator and a second type of user input as a negative user indicator. In one or more embodiments, the digital selection system recognizes a left mouse click, a single tap touch gesture, a circle, or another type of user input as an indication of a positive user indicator. Similarly, the digital selection system can recognize a right mouse click, a double tap touch gesture, an "x," or as an indication of a negative user indicator.

It will be appreciated that although the embodiment of FIG. 1A identifies the user indicators 104, 106 based on user input, the digital selection system can alternatively receive user indicators in a variety of ways. For example, in one or more embodiments, the digital selection system receives user input from another algorithm or tool. For instance, as described in greater detail below with regard to digital videos, the digital selection system can receive a user indicator that reflects a previously generated object boundary or mask.

As mentioned previously, the digital selection system utilizes a digital image together with user indicators to generate distance maps. For example, as illustrated in FIG. 1A, the digital selection system generates distance maps 110, 112 based on the digital image 100 and the user indicators 104, 106. In particular, the digital selection system generates a positive distance map 110 based on the positive user indicator 104. Moreover, the digital selection system generates a negative distance map 112 based on the negative user indicator 106.

As used herein, the term "distance map" refers to a digital item that reflects a distance between a pixel and an indicated pixel in a digital image. For instance, a distance map can include a database or digital file that includes distances between pixels in a digital image and indicated pixels (i.e., positive user indicators or negative user indicators). For example, a positive distance map includes a digital item that reflects a distance between a pixel in a digital image and an indicated pixel that is part of a target object. Similarly, a negative distance map includes a digital item that reflects a distance between a pixel and an indicated pixel that is not part of a target object.

For example, with regard to the embodiment of FIG. 1A, the positive distance map 110 comprises a two-dimensional matrix with entries for each pixel in the digital image 100. Specifically, the positive distance map 110 comprises a matrix with entries for pixels in the digital image 100, where each entry reflects the distance between the pixel corresponding to the entry and the positive user indicator 104. Thus, as illustrated, an entry 114 in the positive distance map 110 reflects the distance (i.e., 80 pixels) between the pixel corresponding to the entry 114 and the pixel corresponding to the positive user indicator 104.

Similarly, the negative distance map 112 comprises a two-dimensional matrix with entries for pixels in the digital image 100. Specifically, each entry in the negative distance map 112 reflects the distance between the pixel corresponding to the entry and the negative user indicator 106. Thus, as illustrated, an entry 116 reflects the distance (i.e., 155 pixels) between the pixel corresponding to the entry 116 and the pixel corresponding to the negative user indicator 106.

The digital selection system can utilize a variety of distance metrics with regard to generating a distance map. For instance, the digital selection system calculates Euclidean distances, geodesic distances, or vector fields. For example, in one or more embodiments, the distance map utilizes a Euclidean distance to determine a straight-line distance between two pixels.

In addition, however, in one or more embodiments, the digital selection system utilizes a geodesic distance that follows curved paths. In particular, in one or more embodiments, the digital selection system calculates a geodesic distance that utilizes curved paths to stay inside (e.g., traverse along) a particular color (or range of colors) within a digital image. For example, the digital selection system can utilize a geodesic distance that identifies a distance between two pixels by staying within a particular color (or range of colors) and avoiding (i.e., going around) colors that are outside the particular color (or range of colors). Moreover, the digital selection system can utilize any type or variety of distance units.

Although FIG. 1A illustrates a single positive user indicator and a single negative user indicator, it will be appreciated that the digital selection system can also generate distance maps based on additional (or fewer) user indicators. For example, in circumstances where the digital selection system receives a plurality of positive user indicators, the digital selection system generates a positive distance map that reflects the distance between a pixel and the nearest positive user indicator. Similarly, in circumstances where the digital selection system receives a plurality of negative user indicators, the digital selection system generates a negative distance map that reflects the distance between a pixel and the nearest negative user indicator. In yet other embodiments, the digital selection system generates a separate distance map for each positive user indicator and negative user indicator. Although the distance maps 110, 112 comprise matrices, it will be appreciated that a distance map can be generated or stored in any form. For example, the distance maps 110, 112 can be implemented as databases, spreadsheets, text files, array, or any other type of digital item.

Moreover, although FIG. 1A illustrates two distance maps 110, 112, it will be appreciated that one or more embodiments utilize a single distance map or additional distance maps. For example, in one or more embodiments, digital selection system creates a single distance map reflecting distances between positive and negative user indicators. In other embodiments, the digital selection system generates additional distance maps (e.g., a distance map for every positive user indicator or a distance map for every negative user indicator).

In addition to distance maps, the digital selection system also utilizes one or more color channels. For example, with regard to the embodiment of FIG. 1A, the digital selection system utilizes three color channels, an R channel 118 (corresponding to red colors), a G channel 120 (corresponding to green colors), and a B channel 122 (corresponding to blue colors). In particular, in one or more embodiments, each color channel 118-122 comprises a two-dimensional matrix with entries for each pixel in the digital image 100. Specifically, as shown, the B channel 122 comprises a matrix with entries for each pixel in the digital image 100, where each entry (e.g., an entry 124) reflects the amount of blue corresponding to each pixel. Thus, the entry 124, corresponding to a pixel with very little blue color, reflects a low value (i.e., one) in the B channel 122.

Although illustrated as three separate channels, the digital selection system can utilize fewer or more channels. For example, the digital selection system can utilize four color channels in conjunction with CMYK images. Similarly, the digital selection system can utilize a single color channel with regard to gray scale images.

Moreover, although illustrated as R, G, and B channels with regard to FIG. 1A, it will be appreciated that the digital selection system can utilize a variety of other colors or color spaces for color channels. For instance, in one or more embodiments, the digital selection system utilizes an LAB color space and LAB color channels rather than an RGB color space and RGB color channels. Moreover, as just mentioned, the digital selection system can utilize CMYK images, gray scale images, or other images.

Additionally, the digital selection system can convert from one type of color image to another. In particular, the digital selection system can convert a CMYK image to an RGB image (or vice versa). In one or more embodiments, the digital selection system can convert a gray scale input image to color by repeating the gray scale channel three time to make equal R, G, and B values at each pixel.

In one or more embodiments the digital selection system generates an image/user interaction pair. As used herein, the term "image/user interaction pairs" refers to a combination of data reflecting the contents of a digital image and data reflecting user interaction or user inputs with regard to a digital image. Thus, for instance the term "image/user interaction pairs" includes a combination of distance maps and color channels. More specifically, the term "image/user interaction pairs" can include a combination of two distance maps (e.g., corresponding to positive and negative user indicators for a digital image, respectively) and three color channels (e.g., corresponding to R, G, and B colors of the digital image, respectively). In particular, the digital selection system generates an image/user interaction pair based on distance maps and color channels. For example, FIG. 1A illustrates generating an image/user interaction pair 126. In particular, the image/user interaction pair 126 is a combination of user interaction data reflected in the positive distance map 110 and the negative distance map 112 and image data reflected in color channels 118-122.

In one or more embodiments, the digital selection system utilizes a series of equations and algorithms to generate the image/user interaction pair 126. For example, in one or more embodiments, the digital selection system defines a sequence of user indicators, $S$, that include a set of positive user indicators, $S^1$ (e.g., the positive user indicator 104), and a set of negative user indicators, $S^0$ (e.g., the negative user indicator 106). In one or more embodiments, the digital selection system utilizes Euclidean distance transformation to transform $S^1$ and $S^0$ to separate channels $U^1$ (e.g., positive distance map 110) and $U^0$ (e.g., the negative distance map 112), respectively. Each channel, $U^1$ and $U^0$, reflects a two-dimensional matrix with the same height and width as a digital image (e.g., the digital image 100). More particularly, the number of rows in the matrix equates to the number of pixel rows in the digital image, and the number of columns in the matrix equates to the number of pixels columns in the digital image.

To calculate the distance value $u_{ij}^t$ (e.g., the entry 114 in the positive distance map 110 or the entry 116 in the negative distance map 112) at the location (i,j), $t \in \{0,1\}$, in one or more embodiments the digital selection system defines an operator, f, that calculates the minimum Euclidean distance between a point (e.g., a pixel in the digital image 100) and a set (e.g., a set of positive user indicators including the positive user indicator 104). In other words, the digital selection system defines operator f such that given a set of points $p_{ij} \in \mathcal{A}$ where (i,j) is the point location, then for any point $p_{m,n} | \mathcal{A} = \min_{\forall p_{ij} \in \mathcal{A}} \sqrt{(m-i)^2 + (n-j)^2}$. Moreover, the digital selection system can define $u_{ij}^t$ (e.g., individual entries in the distance maps) by the following:

$$u_{ij}^t = f(p_{i,j} | S^t), t \in \{0,1\}$$

In one or more embodiments, for the efficiency of data storage, the digital selection system takes the unsigned integer part of $u_{ij}^t$ and truncates it at 255.

Accordingly, with regard to the embodiment of FIG. 1A, the digital selection system generates the positive distance map 110 and the negative distance map 112 utilizing the channels $U^1$ and $U^0$. For instance, the channel $U^1$ provides the matrix illustrated with regard to positive distance map 110. Moreover, the digital selection system combines color channels 118-122 with the distance maps reflecting $U^1$ and $U^0$ to generate the image/user interaction pair 126.

As mentioned previously, the digital selection system can provide information regarding a digital image and user indicators to a trained neural network to identify and select a target object. More particularly, the digital selection system can provide an image/user interaction pair to a trained neural network to identify and select a target object.

FIG. 1B illustrates the digital selection system 100 providing the image/user interaction pair 126 to a trained neural network 128. Moreover, FIG. 1B shows the trained neural network 128 generating a probability map 130 and utilizing the probability map 130 to generate an object boundary 132. In this manner, the digital selection system identifies pixels representing the target object 102.

The digital selection system utilizes one or more deep learning algorithms to generate the trained neural network 128. In particular, the digital selection system utilizes a fully convolutional neural network. For example, the digital selection system utilizes a fully convolutional neutral network as described in J. Long, E. Shelhamer, and T. Darrell, *Fully Convolutional Networks for Semantic Segmentation, arXiv preprint arXiv:* 1411.4028, 2014, with some modifications. The entire contents of the foregoing paper are hereby incorporated by reference. For instance, with regard to the embodiment of FIG. 1B, the digital selection system utilizes a fully convolutional neural network modified such that input data has five channels (e.g., two channels corresponding to distance maps and three channels corresponding to color channels, as illustrated in FIG. 1A).

As mentioned, the digital selection system utilizes the trained neural network 128 to generate the probability map 130. As used herein, the term "probability map" refers to a digital item that reflects the likelihood that a pixel is part of a target object. For instance, a probability map can include a two-dimensional matrix with entries corresponding to pixels in a digital image, wherein each entry reflects the likelihood that the corresponding pixel is part of a target object. For example, as illustrated, the trained neural network 128 utilizes the image/user interaction pair 126 (comprising two distance channels and three color channels) to generate the probability map 130. In particular, the probability map 130 is a matrix that reflects, for each pixel in the digital image 100, the likelihood that the pixel is part of the target object 102. Specifically, as illustrated, the probability map 130 includes an entry 134 reflecting the likelihood (i.e., 75%) that the pixel corresponding to the entry 134 is part of the target object 102.

Although illustrated as a percentage with regard to FIG. 1B, a probability map can utilize a variety of different values to reflect a likelihood. For instance, in one or more embodiments, the digital selection system generates a probability map comprised of selection scores. Moreover, in such embodiments, the selection scores can be expressed in a unit or value other than a percentage.

As discussed previously, the digital selection system utilizes a probability map to select a target object in a digital image. For example, in one or more embodiments, the digital selection system selects a target object by applying a threshold to a probability map. For instance, in one or more embodiments, the digital selection system identifies a threshold (e.g., 50%) and if a value of the probability map exceeds the threshold (e.g., exceeds 50%), the digital selection system determines that the pixel corresponding to the value of the probability map is part of the target object. In this manner, the digital selection system can identify pixels belonging to a target object and select pixels belonging to the target object. Moreover, the digital selection system can identify an object boundary for the target object (e.g., by identifying pixels along the edge of the target object).

In addition, one or more embodiments of the digital selection system utilize a graph cuts optimization algorithm to select a target object. In particular, one or more embodiments of the digital selection system utilize graph cuts optimization to refine an object boundary corresponding to a target object. By combining fully convolutional neural networks (i.e., a probability map resulting from a fully convolutional neural network) with graph cuts optimization, in one or more embodiments, the digital selection system achieves near perfect interactive segmentation results with minimal user interactions.

For instance, consider a probability map, Q (e.g., the probability map 130), of which the entry $q_{ij}$ indicates the likelihood that pixel $p_{ij}$ is part of the target object. In one or more embodiments, the digital selection system integrates Q into the graph cuts optimization $$\min \lambda \cdot R(L) + B(L)$$

where $\lambda$ is a coefficient that specifies a relative importance between R(L) and B(L).

The first term is defined as:

$$R(L) \sum_{p_{ij} \in P} R_{p_{ij}}(L_{p_{ij}})$$

where $R_{p_{ij}}(L_{p_{ij}})$ estimates the penalty of assigning pixel $p_{ij}$ to label $L_{p_{ij}}$. In one or more embodiments, the digital selection system defines:

$$R_{p_{ij}}(L_{p_{ij}}) = \begin{cases} -\log(q_{ij}), & \text{if } L_{p_{ij}} = \text{"object"} \\ -\log(1 - q_{ij}), & \text{otherwise} \end{cases}$$

In addition, the second term is defined as:

$$B(L) = \sum_{\{p_{ij}, p_{mn}\} \in N} B_{\{p_{ij}, p_{mn}\}} \cdot \delta(L_{p_{ij}}, L_{p_{mn}})$$

where $B_{\{p_{ij}, p_{mn}\}}$ comprises the properties of object boundaries. In one or more embodiments, the digital selection system defines $$B_{\{p_{ij}, p_{mn}\}} \propto \exp\left(-\frac{(I_{p_{ij}} - I_{p_{mn}})^2}{2\sigma^2}\right) \cdot \frac{1}{\text{dist}\{p_{ij}, p_{mn}\}}$$

Moreover, in one or more embodiments, the digital selection system solves $\min \lambda \cdot R(L) + B(L)$ utilizing max-flow/min-cut energy minimization. In this manner, the digital selection system can integrate graph cuts optimization with a neural network to refine an object boundary with regard to a target object. More particularly, with regard to the embodiment of FIG. 1B, the digital selection system utilizes graph cuts optimization in conjunction with the probability map 130 to generate the object boundary 132 corresponding to the target object 102.

In one or more embodiments, the digital selection system applies one or more thresholds in conjunction with graph cut optimization. For example, the digital selection system can apply a threshold to the probability map (e.g., a threshold that filters values in the probability map that are less than 50%). In other words, the digital selection system can filter out pixels having a probability of less than 50% that they are part of the target object. Furthermore, the digital selection system can apply graph cut optimization to the filtered.

Although FIGS. 1A-1B illustrate the object boundary 132 generated from an initial set of the user indicators 104, 106, it will be appreciated that the digital selection system can receive additional user indicators and interactively update an object boundary based on the additional user indicators. For example, with regard to FIGS. 1A-1B, if the object boundary 132 fails to accurately capture all of the pixels of the target object 102, a user can provide one or more additional positive user indicators and/or one or more additional negative user indicators. In response, in one or more embodiments, the digital selection system generates modified distance maps (to reflect the additional one or more user indicators), a new image/user interaction pair, a new probability map (utilizing the trained neural network 128), and a modified object boundary. In this manner, the digital selection system can iteratively incorporate user interaction with deep learning techniques to accurately select a target object in a digital image.

Figure 1C:
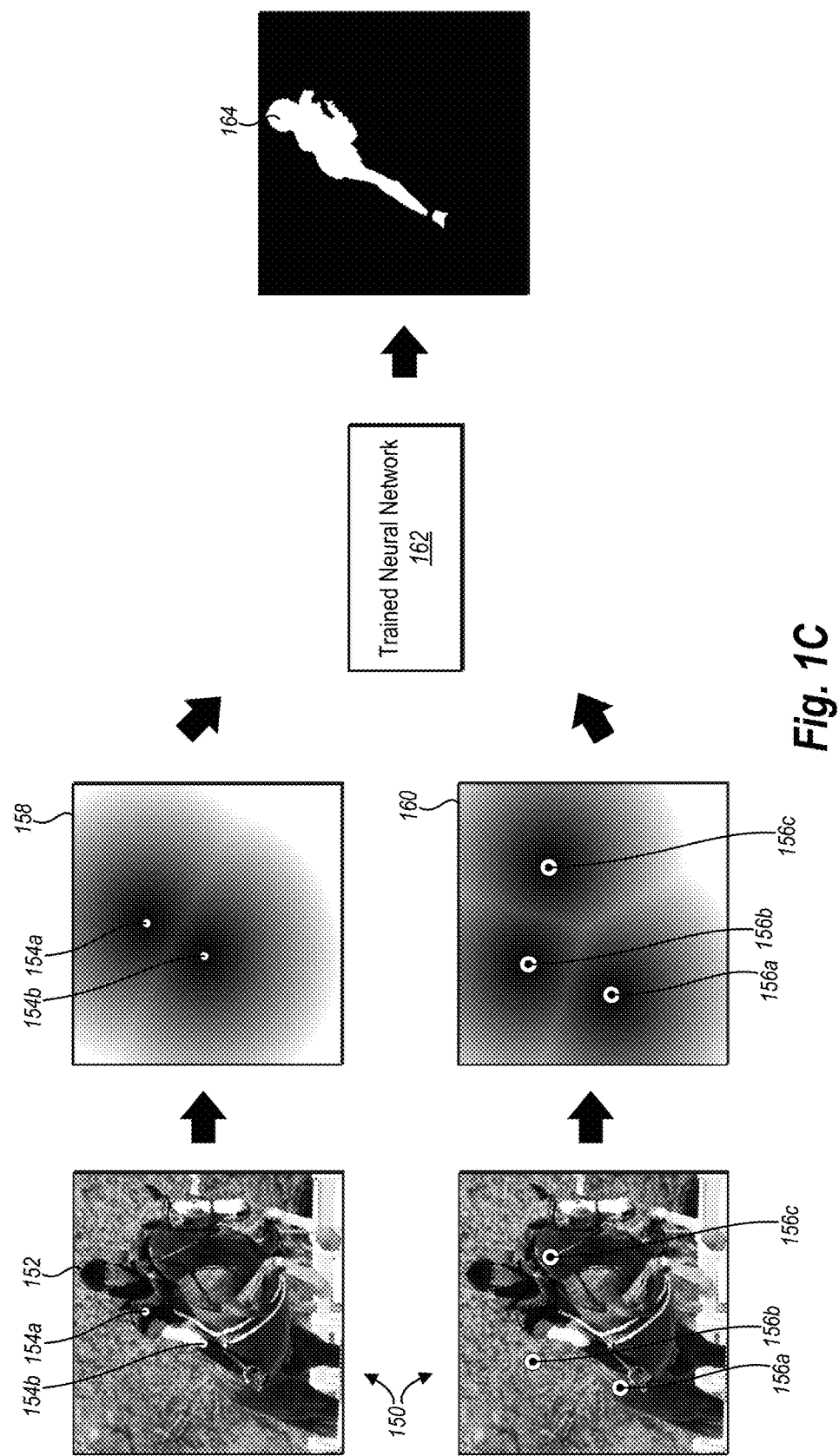
FIG. 1C illustrates a representation of selecting a target object utilizing multiple positive and negative user indicators in accordance with one or more embodiments.

For example, FIG. 1C illustrates utilizing multiple positive and negative indicators to select a target object in accordance with one or more embodiments. In particular, FIG. 1C illustrates a digital image 150 with a target object 152, positive user indicators 154a-154b, and negative user indicators 156a-156c. As illustrated, the digital selection system transforms the positive user indicators 154a-154b to a positive distance map 158 and transforms the negative user indicators 156a-156c to a negative distance map 160. The distance maps 158, 160 reflect a distance between pixels in the digital image 150 and the positive and negative user indicators 154a-154b, 156a-156c. In particular, the digital selection system generates the distance maps 158, 160 by converting distances between pixels and the positive and negative user indicators 154a-154b, 156a-156c into gray scale (e.g., the lower the distance to a user indicator, the darker the pixel in the distance map), thus creating the gray scale distance maps 158, 160.

As illustrated, the digital selection system provides the positive and negative distance maps 158, 160 (together with one or more color channels) to the trained neural network 162. In particular, the digital selection system concatenates the distance maps (and color channels) into an image/user interaction pair and provides the image/user interaction pair to the trained neural network 162. Moreover, utilizing the trained neural network 162, the digital selection system generates an object mask 164 reflecting the pixels included in the target object 152. In this manner, the digital selection system can select a target object utilizing multiple positive and negative user indicators.

Upon selecting a target object, the digital selection system can also modify the target object. For example, the digital selection system modifies the appearance, color, location, size, hue, or orientation of a target object. Similarly, the digital selection system can copy or paste the target object (e.g., copy the target object and past the target object into another image). Moreover, the digital selection system can delete the target object (e.g., remove the target object from the digital image).

In addition, in one or more embodiments, the digital selection system utilizes information generated regarding a target object to train a neural network. For instance, the digital selection system identifies a plurality of pixels defining a target object, an object boundary, or a binary mask with regard to the target object 102. The digital selection system provides the identified pixels, object boundary, or mask to a neural network to train the neural network. For instance, in one or more embodiments, the digital selection system provides information generated regarding a target object, the digital image, and user indicators to train a neural network to select one or more target objects. For instance, the digital selection system can add the digital image to a repository utilized to train a neural network.

Indeed, as mentioned previously, the digital selection system can train a neural network based on a repository of digital training images. In particular, as mentioned, FIGS. 2A-4 illustrate generating a trained neural network in accordance with one or more embodiments.

Figure 2A:
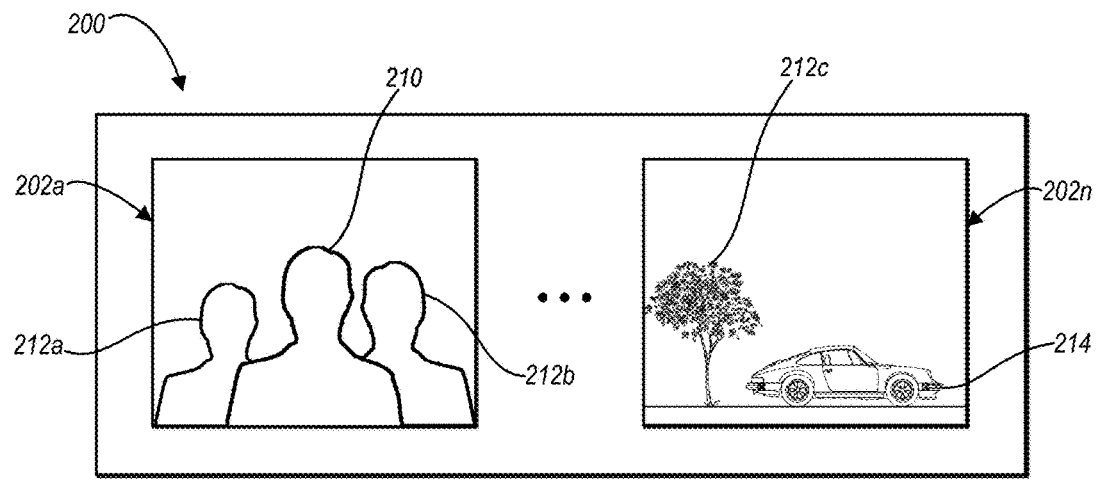
FIG. 2A illustrates a representation of a repository of digital training images in accordance with one or more embodiments.
Figure 2B:
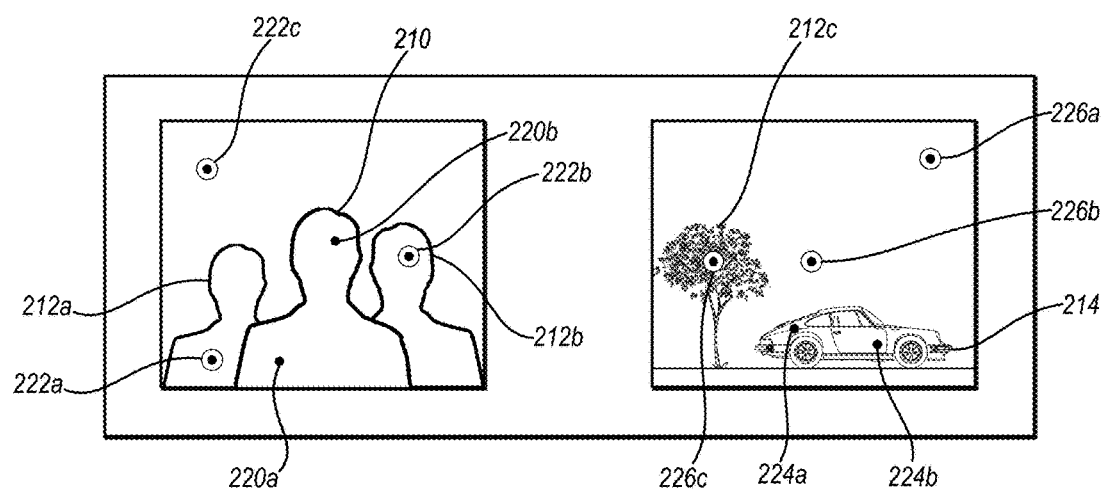
FIG. 2B illustrates a representation of training indicators with regard to digital training images in accordance with one or more embodiments.

For example, FIGS. 2A-2B illustrate a repository of digital training images in accordance with one or more embodiments. As mentioned above, in one or more embodiments, the digital selection system utilizes a repository of digital training images comprising target objects together with training object data to train a neural network. As used herein, the term "training object data" refers to digital data identifying one or more characteristics of a digital training object. In particular, the term "training object data" includes digital data identifying pixels representing a digital training object. For example, the term "training object data" includes a ground truth mask reflecting the pixels representing a digital target object (or a digital untargeted object). Similarly, the term "training object data" includes an object boundary of a digital target object (or digital untargeted object). Moreover, a digital training object (i.e., a digital target object or digital untargeted object) with "training object data" is referred to herein as an "identified" training object. Specifically, FIG. 2A illustrates a representation of a repository 200 comprising digital training images 202a-202n that include objects 210-214. Moreover, the repository 200 includes training object data (e.g., object boundaries or ground truth masks) corresponding to the objects 210-214. Thus, the objects 210-214 are "identified" objects.

The repository 200 can comprise any group or collection of digital media items. For instance, in one or more embodiments, the repository 200 comprises a repository of digital images stored on a remote server. For example, in one or more embodiments, the repository 200 comprises the Pascal segmentation dataset, the MS coco dataset, or another dataset. Furthermore, as mentioned above the repository 200 can include digital images where target objects have been previously identified by the digital selection system by applying a neural network in conjunction with user identifiers.

Moreover, as mentioned previously, the digital selection system can utilize sampling strategies to generate training indicators with regard to digital training images. In particular, the digital selection system can utilize sampling strategies that model user input patterns. For instance, the digital selection system generates positive training indicators (i.e., training indicators that are part of target objects in digital target images) and negative training indicators (i.e., training indicators that are not part of target objects in target training images).

For example, as illustrated in FIG. 2B the digital selection system generates positive training indicators 220a, 220b corresponding to the target object 210 (i.e., positive training indicators within the target object 210). Moreover, the digital selection system generates negative training indicators 222a-222c outside the target object 210 (i.e., in the background of the digital training image 202a). Similarly, the digital selection system generates positive training indicators 224a, 224b within the target object 214 and negative training indicators 226a-226c outside the target object 214.

It should be noted that the digital selection system can generate negative training indicators corresponding to untargeted objects. Thus, as illustrated in FIG. 2B, the digital selection system generates the negative training indicator 222a within the untargeted object 212a, and the negative training indicator 222b within the untargeted object 212b. Similarly, as illustrated, the digital selection system generates the negative training indicator 226c within the untargeted object 212c.

The digital selection system can utilize a variety of approaches to generate positive and negative training indicators. For instance, in one or more embodiments, the digital selection system utilizes random sampling techniques to model user input patterns. In other embodiments, the digital selection system utilizes sampling techniques selected to cover a target object or an area around a target object. Moreover, on other embodiments, the digital selection system utilizes random sampling techniques within untargeted objects.

Figure 3A:
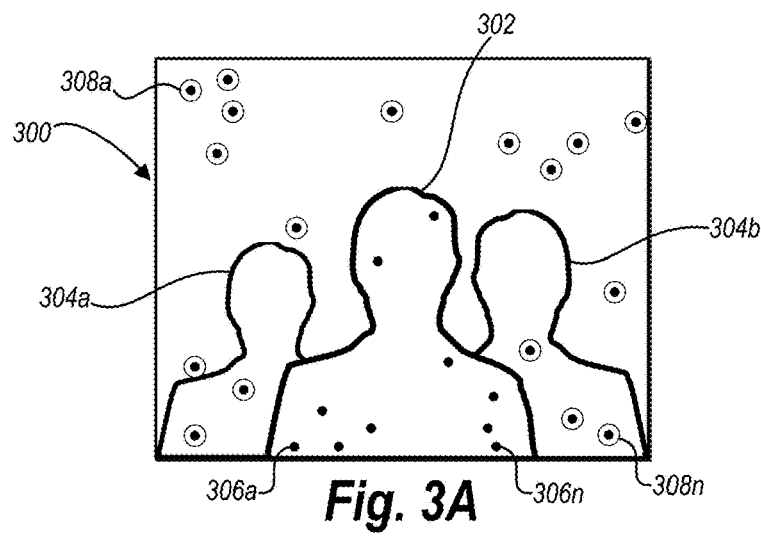
FIG. 3A illustrates a representation of generating training indicators in accordance with one or more embodiments.
Figure 3B:
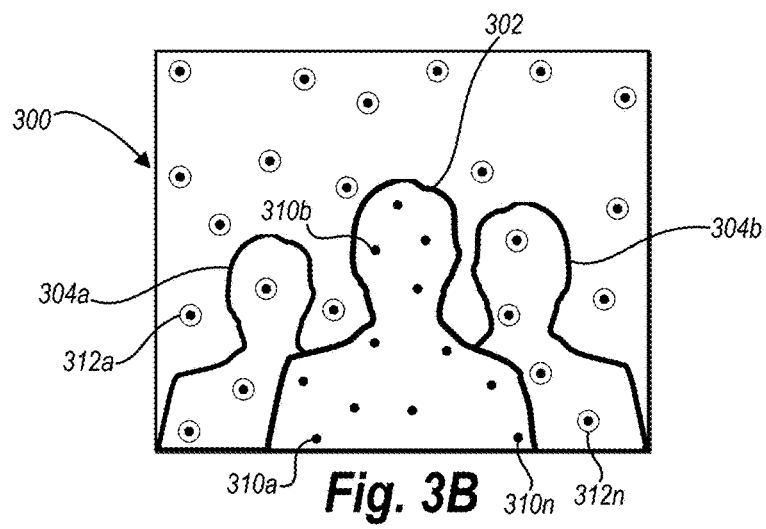
FIG. 3B illustrates another representation of generating training indicators in accordance with one or more embodiments.
Figure 3C:
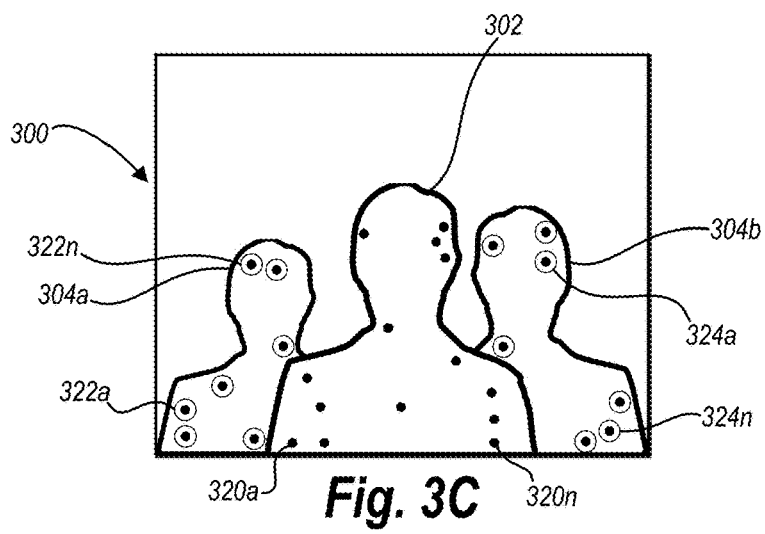
FIG. 3C illustrates another representation of generating training indicators in accordance with one or more embodiments.

For example, FIGS. 3A-3C illustrate sampling training indicators in accordance with one or more embodiments. In particular, FIG. 3A illustrates a digital training image 300 (i.e., the digital training image 202a) portraying a target object 302, untargeted objects 304a-304b, positive training indicators 306a-306n, and negative training indicators 308a-308n.

As just mentioned, the digital selection system can randomly generate positive training indicators from an area within a target object. Moreover, in one or more embodiments, the digital selection system randomly generates negative samples from an area outside the target object. In accordance with these embodiments, FIG. 3A illustrates the digital selection system generating the positive training indicators 306a-306n by randomly sampling the area within the target object 302. FIG. 3A illustrates the digital selection system generating the negative training indicators 308a-308n by randomly sampling the area outside the target object 302.

In some circumstances, however, random sampling fails to provide sufficient information regarding boundaries, shapes, or features of target objects in training a neural network. Accordingly, in one or more embodiments, the digital selection system samples training indicators based on the location of (or distance to) other training indicators. More specifically, in one or more embodiments, the digital selection system samples positive training indicators to cover the target object with positive training indicators. Similarly, in one or more embodiments, the digital selection system samples negative training indicators to surround the target object with negative training indicators.

For example, FIG. 3B illustrates the digital training image 300 with positive training indicators 310a-310n and negative training indicators 312a-312n corresponding to the target object 302. The digital selection system generates the positive training indicators 310a-310n such that the positive training indicators are spread across a target object. In particular, the digital selection system randomly samples a pixel within the target object as the positive training indicator 310a. Then, the digital selection system computes the minimum distances of pixels in the target object 302 to pixels outside the target object 302 and to the sampled pixel. In one or more embodiments, the pixel location having the largest distance (based on the computed minimum distances) will be sampled as a new positive training indicator. In particular, utilizing this approach, the digital selection system identifies the positive training indicator 310b. Moreover, the digital selection system continues sampling until generating the positive training indicators 310a-310n.

Similarly, the digital selection system generates the negative training indicators 312a-312n such that the negative training indicators are spread around the target object 302. In particular, the digital selection system randomly samples a pixel that does not belong to the target object 302 as the negative click 312a. Moreover, the digital selection system computes the minimum distances of pixels not within the target object 302 to pixels belonging to the target object 302 and to the pixel corresponding to the negative click 312a. In one or more embodiments, the pixel location having the largest distance (based on the computed minimum distances) will be sampled as a new negative training indicator. In particular, utilizing this approach, the digital selection system identifies the negative training indicator 312b. Moreover, the digital selection system continues sampling until generating positive training indicators 312a-312n.

In other embodiments, the digital selection system samples positive training indicators and/or negative training indicators from regions in close proximity to a target object. For example, the digital selection system can sample positive training indicators within the target object 302 and within a particular distance to the target object 302. Similarly, the digital selection system can sample negative training indicators from an area outside the target object 302 but within a particular distance to the target object 302.

In some circumstances, however, sampling based on a location of (or distance to) a target object or training indicator can lead to a strong pattern in the training indicators. Moreover, strong patterns in the training data can result in biased training of a neural network. For example, a neural network can improperly learn to select a target object based on a distance or spread present in the training indicators, a distance or spread that does not correspond to real-world user input. Accordingly, in one or more embodiments, the digital selection system samples positive training indicators randomly from within a target object and samples negative training indicators from untargeted objects.

For example, FIG. 3C illustrates the digital training image 300 with positive training indicators 320a-320n and negative training indicators 322a-322n and 324a-324n. In particular, FIG. 3C illustrates the negative training indicators 322a-322n within the untargeted object 304a and the negative training indicators 324a-324n within the untargeted object 304b. The digital selection system generates the positive training indicators 320a-320n by randomly sampling pixels within the target object 302. Accordingly, the positive training indicators 320a-32n reflect a random distribution of pixels within the target object 302.

Similarly, the digital selection system generates the negative training indicators 322a-322n and 324a-324n by randomly sampling from pixels within the untargeted objects 304a, 304b. Specifically, the digital selection system generates the negative training indicators 322a-322n by randomly sampling pixels within the untargeted object 304a. The digital selection system generates the negative training indicators 324a-324n by randomly sampling pixels within the untargeted object 304b. In this manner, the digital selection system can generate training indicators that model negative user inputs by users with regard to untargeted objects.

In one or more embodiments, the digital selection system samples positive training indicators and negative training indicators using a combination of sampling methods. Thus, in one or more embodiments, the digital selection system randomly samples some positive training indicators from within a target object of first target image, randomly samples some negative training indicators from outside a target object of a second target image, randomly samples some positive training images based on a location of (or distance to) other positive training indicators within a third target image, samples some negative training indicators based on a location of (or distance to) other negative training indicators within a fourth target image, and samples some negative training images from within untargeted objects of a fifth target image. Indeed, one or more embodiments randomly select a sampling method for each digital training image (or each target object).

In addition, rather than randomly selecting a sampling method for each digital training image (or each target object), in one or more embodiments, the digital selection system randomly selects a sampling method for each training indicator. Thus, the digital selection system can select multiple training indicators for the same training image utilizing different sampling methods (e.g., random, from untargeted objects, or based on a distance from another training indicator).

Moreover, in one or more embodiments, the digital selection system applies one or more filters in generating training indicators. For example, rather than sampling from all pixels in a digital image, the digital selection system can filter out certain pixels. For instance, the digital selection system filters pixels in a digital image such that any two pixels are at least a minimum distance away from other pixels. Similarly, the digital selection system can filter pixels so that any pixel is a minimum distance (or a maximum distance) from a target object.

In addition, the digital selection system can identify a number of training indicators (e.g., a number of positive training indicators and a number of negative training indicators) to generate with regard to any particular digital training image. For example, in one or more embodiments, the digital selection system randomly selects a number of training indicators within a particular range (e.g., randomly selects a number between 1 and 20). In other embodiments, the digital selection system identifies the number of training indicators based on one or more features or characteristics of the digital image (e.g., the number of objects in the digital image, the size of the digital image, or the complexity of the digital image).

Furthermore, in one or more embodiments, the digital selection system utilizes a series of equations and/or algorithms to generate training indicators. For instance, in one or more embodiments, the digital selection system defines a set of pixels within a target object, $\mathcal{O}$, (e.g., ground truth pixels of the target object 302). The digital selection system defines a set $\mathcal{G}$ as follows:

$$\mathcal{G} = \{p_{i,j} | p_{i,j} \in \mathcal{O} \text{ or } f(p_{i,j} | \mathcal{O}) \geq d\}$$

where d is a distance to the target object (e.g., the distance to the target object 302). Similarly, the digital selection system defines $\mathcal{G}^c$ as the complementary set of $\mathcal{G}$. As defined, the pixels in $\mathcal{G}^c$ have two properties: 1) they are background pixels (i.e., pixels that do not belong to the target object 302) and 2) they are within a certain distance range, d, to the target object. To sample positive training indicators, in one or more embodiments, the digital selection system randomly samples n pixels in $\mathcal{O}$ where $n \in N_{pos}$.

As mentioned above, in one or more embodiments, the pixels in $\mathcal{O}$ are filtered such that 1) any two pixels are at least $d_{step}$ pixels away and 2) any pixel is at least $d_{margin}$ pixels away from the target object. Moreover, to sample negative clicks, one or more embodiments utilize the following three sampling strategies to model user input patterns.

Strategy 1: (e.g., the embodiment of FIG. 3A), the digital selection system randomly samples the set $\mathcal{G}^c$, where $n \in N_{neg1}$, and $\mathcal{G}^c$ is filtered in the same manner as $\mathcal{O}$.

Strategy 2: (e.g., the embodiment of FIG. 3B), the digital selection system samples $N_{neg2}$ negative training indicators to cover the outside object boundaries as much as possible. Specifically, the first negative training indicator is randomly sampled in $\mathcal{G}^c$ and subsequent negative samples are obtained by the following:

$$p_{next} = \underset{p_{i,j}}{\operatorname{argmax}} f(p_{i,j} | \mathcal{S}^0 \cup \mathcal{G})$$

where, f, $p_{i,j}$, $\mathcal{S}^0$ have the same definitions and attributes as described above. Moreover, as mentioned above, $\mathcal{S}^0$, includes all previous negative training indicators.

Strategy 3: (e.g., the embodiment of FIG. 3C), the digital selection system randomly samples $N_{neg3}$ negative training indicators on each untargeted object, $\mathcal{O}_i$, in the digital training image, where $\mathcal{O}_i$ reflects the pixels defining each untargeted object, and where each $\mathcal{O}_i$ is filtered in the same way as $\mathcal{O}$.

Similarly, as described above, the digital selection system can utilize Strategy 1 and Strategy 2 to generate positive training indicators. In particular, in one or more embodiments (e.g., the embodiment of FIG. 3A), the digital selection system generates positive training indicators by randomly sampling the set $\mathcal{G}$, and $\mathcal{G}$ is filtered in the same manner as $\mathcal{O}$. Similarly in one or more embodiments, the digital selection system generates positive training indicators by identifying a first positive training indicator that is randomly sampled in $\mathcal{G}$ and subsequent positive training indicators are obtained by the following:

$$p_{next} = \underset{p_{i,j}}{\operatorname{argmax}} f(p_{i,j} | \mathcal{S}^1 \cup \mathcal{G}^c)$$

where, as mentioned above, $\mathcal{S}^1$ includes all previous positive training indicators.

As described previously, one or more embodiments of the digital selection system combine sampling strategies (e.g., Strategy 1, Strategy 2, Strategy 3). For example, in one or more embodiments, the digital selection system generates training samples for each training object (or each training indicator) by randomly selecting one of the sampling strategies with an equal probability.

As mentioned previously, the digital selection system can utilize a plurality of digital training images and training indicators to train a neural network. In particular, the digital selection system can generate a plurality of image/user interaction pairs and utilize the pairs to train a neural network. For example, FIG. 4 illustrates training a neural network in accordance with one or more embodiments.

Figure 4:
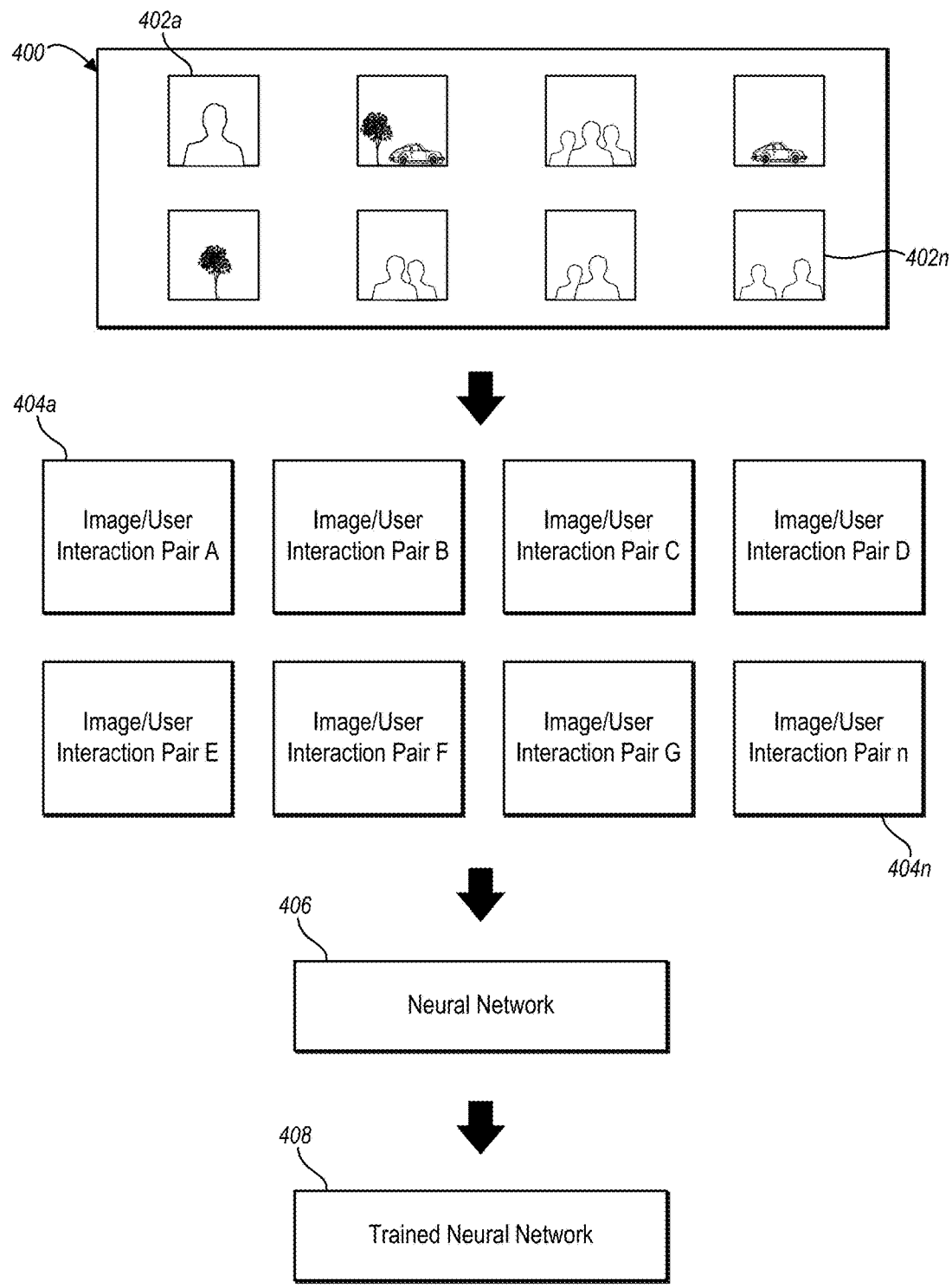
FIG. 4 illustrates a representation of generating a trained neural network from a repository of digital training images in accordance with one or more embodiments.

In particular, FIG. 4 illustrates a repository 400 with a plurality of digital training images 402a-402n (e.g., the repository 200). Each of the plurality of digital training images 402a-402n reflects a target object. Moreover, each of the plurality of digital training images corresponds to training object data (e.g., ground truth masks corresponding to objects represented in the digital training images).

As illustrated, the digital selection system transforms the plurality of digital training images into a plurality of corresponding image/user interaction pairs 404a-404n. In particular, as discussed previously, the digital selection system samples training indicators with regard to each digital training image 402a-402n (e.g., utilizing Strategy 1, Strategy 2, Strategy 3, or using other techniques). As described with regard to FIGS. 1A-1B, the digital selection system transforms the training samples into distance maps. In particular, the digital selection system generates positive training distance maps based on positive training simples. The digital selection system also generates negative training distance maps based on negative training samples. Similarly, the digital selection system generates training color channels with regard to the training digital training images 402a-402n. Utilizing the generated training distance maps and the digital training images, the digital selection system generates the plurality of image/user interaction pairs 404a-404n. In particular, each of the image/user interaction pairs 404a-404n correspond to one of digital training images 402a-402n.

As shown in FIG. 4, the digital selection system provides the image/user interaction pairs 404a-404n as input to a neural network 406. In particular, the digital selection system provides the image/user interaction pairs 404a-404n together with training object data as input to the neural network 406. The digital selection system can provide a variety of training object data depending on the embodiment. For instance, in one or more embodiments, the digital selection system provides an identified target object (e.g., a mask of an object selected as a target object). In one or more embodiments, the digital selection system provides ground truth masks, object boundaries, shape information, or other identifying information regarding the target objects and other objects reflected in digital training images. For example, in one or more embodiments, the digital selection system provides binary masks with regard to target objects (e.g., matrices of binary values indicating pixels that are part of a target object and pixels that are not part of a target object) as training object data.

As illustrated, the digital selection system provides training input to the neural network 406 and generates a trained neural network 408. In particular, the neural network 406 receives the image/user interaction pairs 404a-404n (and training object data). Moreover, the neural network 406 analyzes the image user interaction pairs 404a-404n, predicts pixels belonging to the target objects (e.g., object boundaries), compares the prediction with training object data, and adjusts internal parameters based on the comparison. In this manner, one or more embodiments generate a trained neural network based on training input.

More particularly, one or more embodiments of the digital selection system trains or fine-tunes a neural network utilizing different stride values. For instance, in one or more embodiments, the digital selection system utilizes fully convolutional neural networks with different stride values. In general, the smaller the stride value, the finer and better the segmentation results. In one or more embodiments, the digital selection system generates a trained neural network by fine-tuning a neural network over different stride values.

For example, with regard to the embodiment of FIG. 4, the digital selection system first fine tunes a stride-32 model utilizing the neural network 406 and the image/user interaction pairs 404a-404n. For example, the digital selection system fines tune a stride-32 FCN model (FCN-32s) from the stride-32 semantic segmentation model of the paper *Fully Convolutional Networks for Semantic Segmentation*, mentioned above. Specifically, the digital selection system trains the stride-32 model over 30 epochs at a learning rate of $10^{-10}$. Then, the digital selection system generates a stride-16 model utilizing the generated stride-32 model and the image/user interaction pairs 404a-404n. Specifically, the digital selection system trains the stride-16 model from the generated stride-32 model at a fixed learning rate of $10^{-12}$. Moreover, the digital selection system generates a stride-8 model from the stride-16 model. Specifically, the digital selection system generates a stride-8 model at a fixed learning rate of $10^{-13}$. Thus, with regard to FIG. 4, the trained neural network 408 reflects a fine-tuned stride-8 model.

Upon generating the trained neural network 408, as previously explained, the digital selection system can utilize the trained neural network to select one or more target objects with regard to a probe digital image (e.g., a probe image not include in the repository 400). Thus, for example, the digital selection system can utilized the trained neural network 408 as the trained neural network 128.

It will be appreciated that although the embodiment of FIG. 4 utilizes particular stride values, the digital selection system can utilize other stride values. For instance, the digital selection system can also generate a stride-4 model from a stride-8 model. Moreover, although certain exemplary learning rates and times have been disclosed with regard to exemplary embodiments, it will be appreciated that alternative embodiments of the digital selection system utilize different learning rates or times. For example, in one or more embodiments, each stride value model is trained over approximately 20 epochs.

In addition, it will be appreciated that although FIGS. 2A-4 illustrate training indicators comprising points (e.g., clicks or touches) the digital selection system can train a neural network to select target objects with different training indicator types. For instance, the digital selection system can train a neural network to select target objects with strokes, bounding boxes, and/or loose boundaries.

For instance, in one or more embodiments, the digital selection system utilizes a neural network based on stroke training indicators. In particular, in one or more embodiments, the digital selection system treats strokes as a collection of clicks (e.g., a collection of individual point indicators). Accordingly, the digital selection system can utilize a neural network trained to select target objects based on clicks to also select target objects based on strokes. In particular, the digital selection system can transform positive and negative strokes to distance maps (as described previously) and utilize a trained neural network to select a target object based on the distance maps.

With regard to bounding boxes, the digital selection system can train a neural network by generating training bounded boxes. For example, in one or more embodiments, the digital selection system generates training bounding boxes corresponding to target objects in digital training images, where the training boxes have varying heights and widths. Moreover, some training bounding boxes are permitted to partially include the target object. In this manner, the digital selection system trains the neural network to identify target objects in a digital image, even where users provide bounding boxes that only partially enclose a target object.

Specifically, in one or more embodiments, the digital selection system defines a new set, $\mathcal{B}$, including all pixels inside a bounding box. In one or more embodiments, the digital selection system transforms the bounding box input to a distance map U by $$u_{ij} = f(p_{i,j}|B^c)$$

The digital selection system utilizes this approach to generate training distance maps and training image/user interaction pairs from digital training images reflecting bounding boxes. Similarly, the digital selection system generates a trained neural network that can receive one or more bounding boxes with regard to a probe digital image and identify a target object.

Similarly, in one or more embodiments, the digital selection system trains a neural network to identify target objects utilizing one or more loose boundaries. In particular, the digital selection system can generate training loose boundaries by randomly altering an object boundary corresponding to a target object in an training image. For example, the digital selection system generates a training loose boundary based on an object boundary of a target object by introducing sampled variations in the object boundary. Specifically, the digital selection system generates a training loose boundary comprising a polygon that is both within and without a target object in a digital training image by sampling random variations in an object boundary to model user input of a loose boundary (e.g., random variations or variations within a certain distance of the object boundary).

Additionally, the digital selection system can train a neural network based on training loose boundaries. For instance, the digital selection system generates one or more training distance maps based on a training loose boundary. In addition, the digital selection system generates training image/user interaction pairs based on the one or more training distance maps. Furthermore, the digital selection system trains a neural network based on the training image/user interaction pairs.

The digital selection system utilizes a trained neural network to identify any type or variety of target objects. In particular, the digital selection system is capable of identifying target objects in probe images regardless of object class. For instance, the digital selection system can identify target objects in probe digital images, even though the target objects belong to a different object class than target objects portrayed in digital training images.

Figure 5:
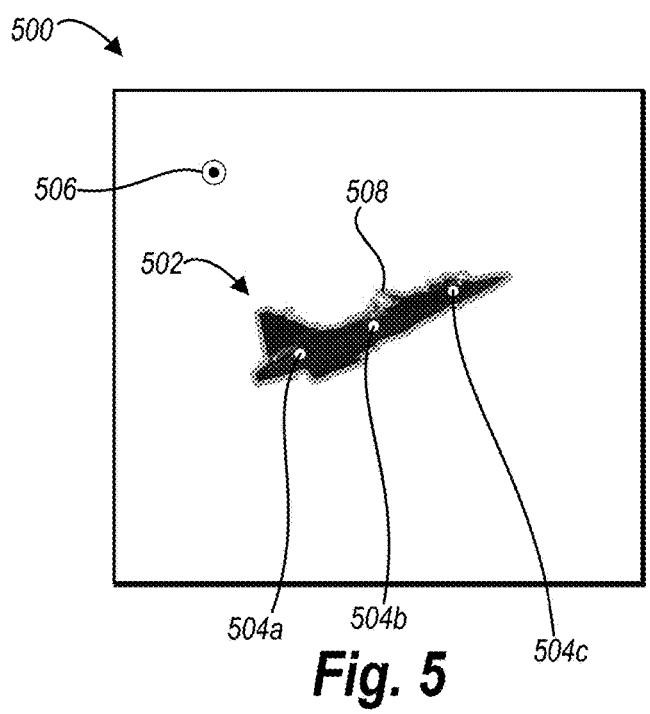
FIG. 5 illustrates a target object in a digital image selected utilizing a trained neural network in accordance with one or more embodiments.

For example, FIG. 5 illustrates a probe digital image 500 including an airplane target object 502. Although not shown (for purposes of clarity), the probe digital image 500 includes a plurality of other objects in addition to the airplane target object 502 (e.g., buildings, clouds, and other objects). The digital selection system receives positive user indicators 504a-504c within the airplane target object 502. The digital selection system also receives negative user indicator 506. Based on the positive user indicators 504a-504c and the negative user indicator 506, the digital selection system generates an object boundary 508.

In particular, with regard to the embodiment of FIG. 5, the digital selection system generates distance maps, generates an image/user interaction pair, and provides the image/user interaction pair as inputs to a trained neural network. Moreover, the digital selection system generates the object boundary 508 utilizing the trained neural network.

Notably, however, the trained neural network utilized to generate the object boundary 508 is not trained utilizing digital training images of planes. In other words, the airplane target object 502 in the probe digital image 500 is of a different object class than target objects in digital training images utilizes to generate the trained neural network. Nonetheless, the digital selection system identifies the airplane target object 502 without accessing a neural network trained to specifically identify planes.

This is because, as described above, the digital selection system trains a neural network based on user indicators in relation to generic target objects (i.e., objects not identified as belonging to any particular object class). For instance, in one or more embodiments, the digital selection system trains a neural network based on object boundaries or other features (shape, truth ground points, etc.), without training a neural network based on a specific object classes corresponding to a target objects (e.g., without identifying target objects as belonging to a class of dogs, bears, trains, planes, or automobiles).

In other words, the digital selection system trains neural networks to identify target objects in a probe digital image, even if the target object in the probe digital image reflects a type of object that was never used to train the neural network. Thus, even though a neural network was never trained with digital training images including planes, the digital selection system can still identify the object boundary 508 with regard to the airplane target object 502.

Aside from, and as a result of, identifying objects generically, the digital selection system also distinguishes between similar objects (e.g., objects belonging to the same or similar object classes). In particular, the digital selection system selects a single object belonging to a particular object class or combine objects belonging to different object classes. For instance, FIGS. 6A-6D illustrate distinguishing between similar objects in making a selection or combining similar objects in making a selection in accordance with one or more embodiments.

Figure 6A:
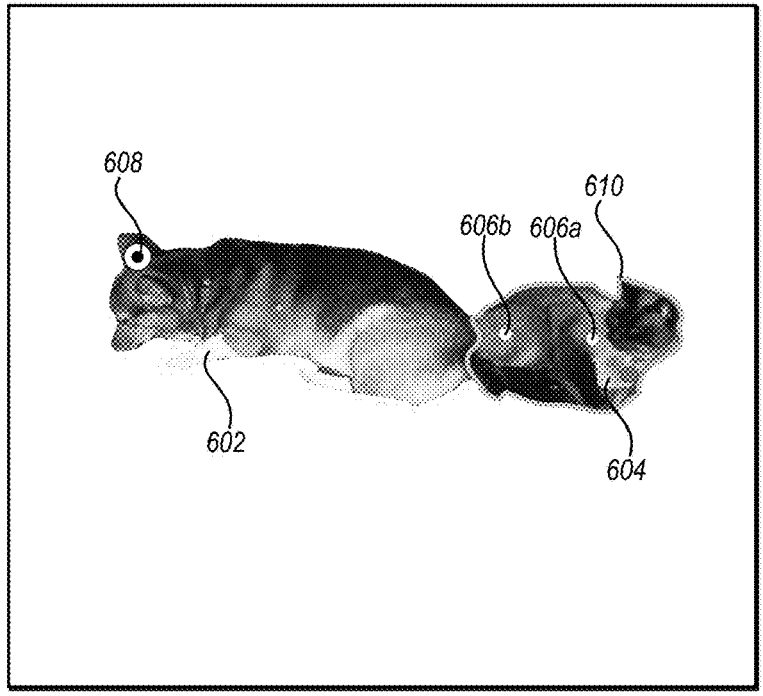
FIG. 6A illustrates two objects represented in a digital image and selection of one of the objects utilizing a trained neural network in accordance with one or more embodiments.

For example, FIG. 6A illustrates a probe digital image 600 reflecting a dog object 602 and a cat object 604 placed side-by-side. Moreover, the digital selection system has received positive user indicators 606a-606b within the cat object 604 and a negative user indicator 608 within the dog object 602. Accordingly, based on the user indicators and a trained neural network, the digital selection system generates an object boundary 610 around the cat object 604. Thus, as illustrated, the digital selection system differentiates, based on user input and the neural network, between two animals (i.e., the dog object 602 and the cat object 604) pictured in the same digital image (i.e., the probe digital image 600).

Figure 6B:
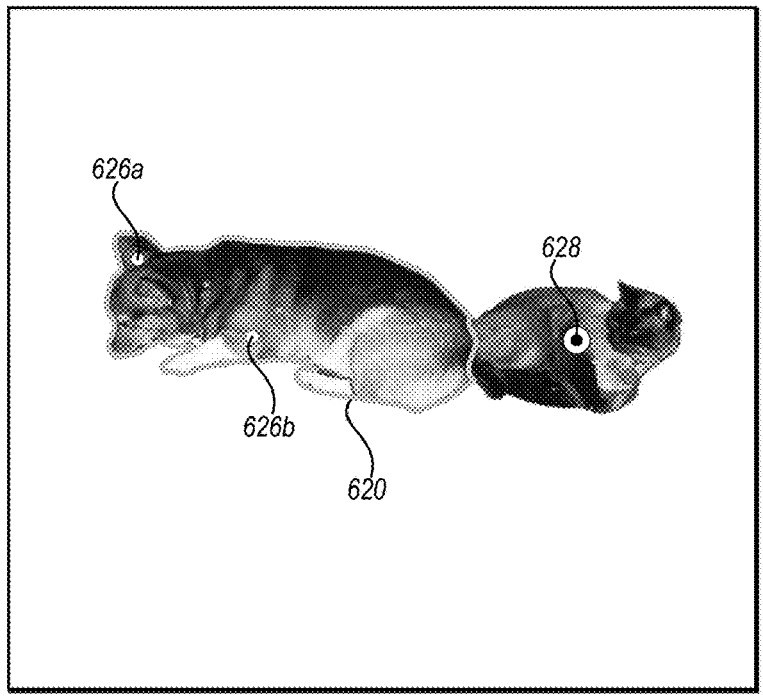
FIG. 6B illustrates two objects represented in a digital image and selection of both objects utilizing a trained neural network in accordance with one or more embodiments.

Similarly, as illustrated in FIG. 6B, the digital selection system can select the dog object 602 (i.e., rather than the cat object 604 as reflected in FIG. 6A). In particular, the digital selection system receives positive user indicators 626a-626b within the dog object 602 and a negative user indicator 628 within the cat object 604. Based on the user indicators and a trained neural network, the digital selection system generates an object boundary 620 with regard to the dog object 602.

Figure 6C:
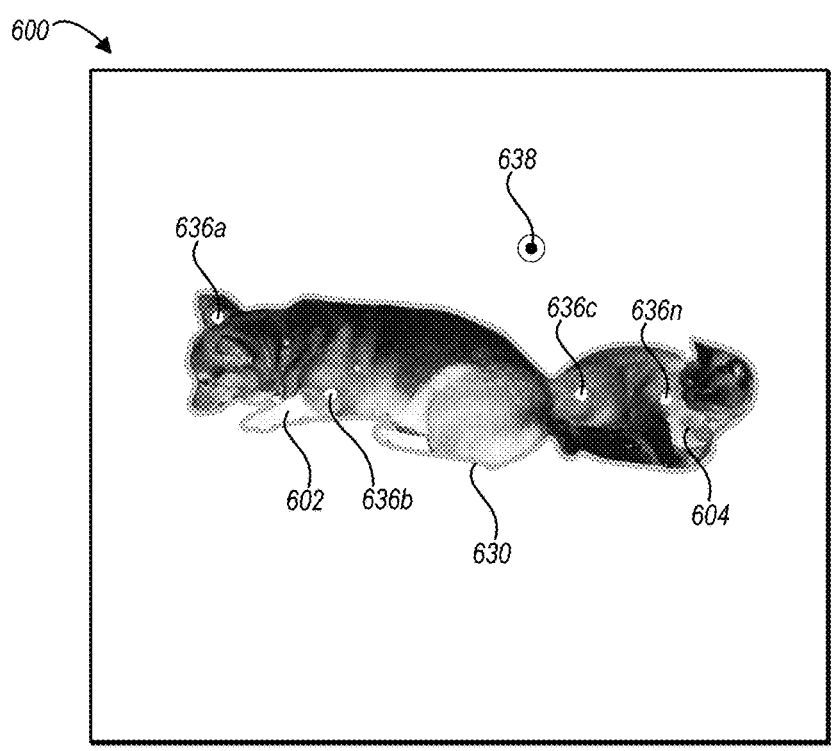
FIG. 6C illustrates two objects represented in a digital image and selection of one of the objects utilizing a trained neural network in accordance with one or more embodiments.

Moreover, as illustrated in FIG. 6C, the digital selection system can also select both the dog object 602 and the cat object 604. In particular, FIG. 6C illustrates positive user indicators 636a-636b within the dog object 602 and positive user indicators 636c-636n within the cat object 604. Accordingly, based on the user indicators and utilizing a trained neural network, the digital selection system generates an object boundary 630 around the dog object 602 and the cat object 604. Accordingly, the digital selection system can combine similar objects (i.e., the dog object 602 and the cat object 604) pictured in the same digital image (i.e., the probe digital image 600).

Although FIGS. 6A-6C illustrate a dog object and a cat object, it will be appreciated that the digital selection system can obtain similar results with regard to two dog objects or two cat objects. In particular, because the digital selection system selects objects without regard object class, the digital selection system distinguishes between two dog objects in a digital image or two cat objects in a digital image. Similarly, the digital selection system can combine two dog objects or combine two cat objects in a digital image. In other words, in one or more embodiments, the digital selection system identifies objects reflected in digital images without regard to object class.

Figure 6D:
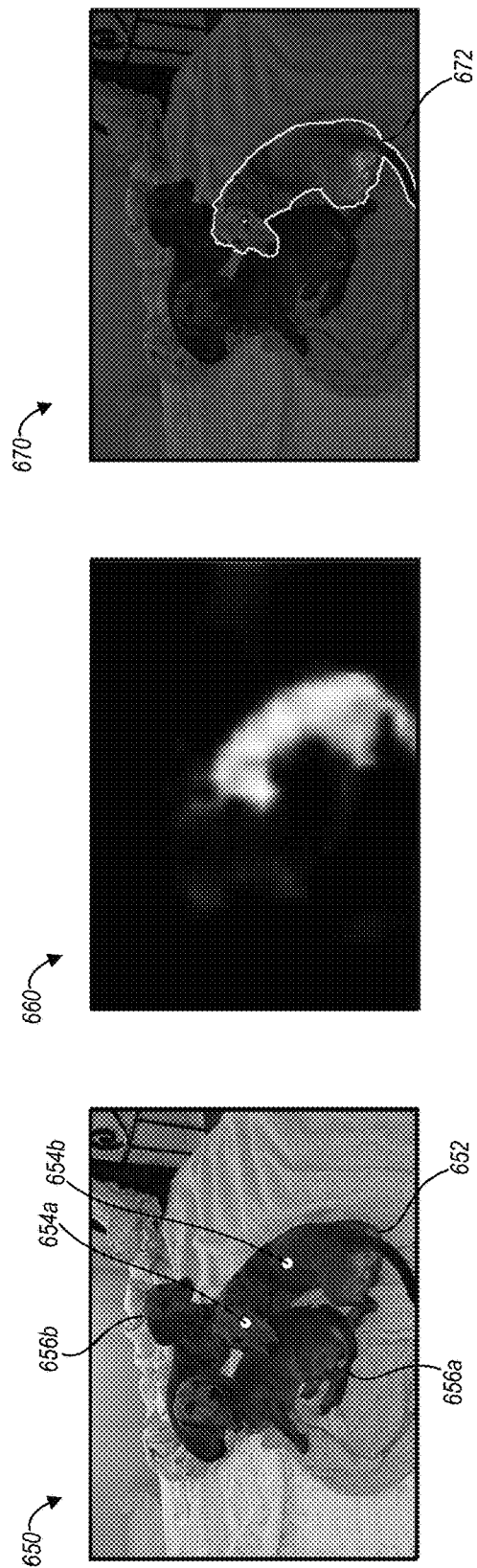
FIG. 6D illustrates selecting a target object from similar objects in a digital image utilizing a probability map and graph cuts optimization in accordance with one or more embodiments.

For example, FIG. 6D illustrates selecting a dog object from multiple dog objects utilizing a trained neural network and graph cuts optimization in accordance with one or more embodiments. In particular, FIG. 6D illustrates a digital image 660 portraying a dog target object 652 and two dog untargeted objects 656a, 656b. In particular, FIG. 6D illustrates the dog target object 652 with two positive user indicators 654a-654b (i.e., the two positive user indicators 654a-654b within the dog target object 652).

As illustrated, the digital selection system utilizes the positive user indicators 654a-654b and a trained neural network to generate a probability map 660. The probability map 660 is a reflection of the probability that each pixel in the digital image 650 is part of the dog target object 652. Specifically, the digital security system generates the probability map 660 by converting a probability to a gray scale (e.g., higher probability is translated to a lighter color). As shown, the probability map 660 provides an indication of the pixels belonging to the dog target object 652.

Furthermore, as discussed above, the digital selection system can utilize a probability map to select a target object utilizing graph cuts optimization. In particular, as illustrated in FIG. 6D, the digital security system can generate the digital image output 670. The digital image output 670 reflects the digital image 650 upon selection of the dog target object 652. In particular, the digital selection system identifies the object boundary 672 corresponding to the dog target object 652. The object boundary 672 defines the boundary between the pixels included in the dog target object 652 and the pixels not included in the dog target object 652.

Notably, the digital selection system identifies the object boundary 672 with regard to a single dog (out of three dogs) represented in the digital image 650. In particular, the digital selection system differentiates between the dog target object 652 and the dog untargeted objects 656a-656b. Thus, even though the dog target object 652 and the dog untargeted objects 656a-656b belong to a common object class (indeed, they are almost identical), the digital selection system can differentiate the objects utilizing user indicators and a trained neural network generated utilizing generic digital images (i.e., digital images comprising one or more target objects that are not identified by object class or type).

Figure 7A:
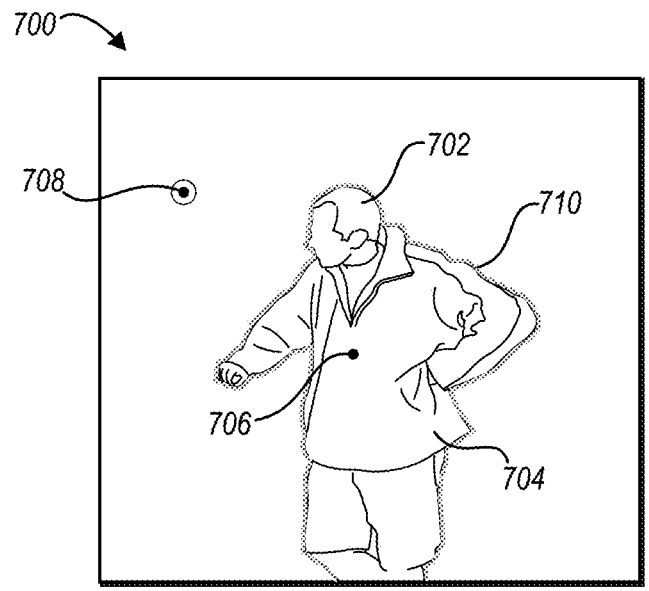
FIG. 7A illustrates an object represented in a digital image and selection of the object utilizing a trained neural network in accordance with one or more embodiments.
Figure 7B:
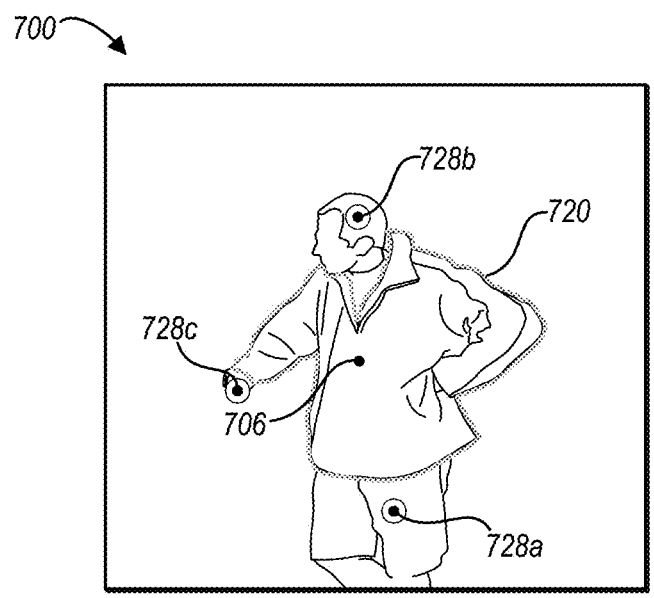
FIG. 7B illustrates the digital image and object of FIG. 7A and utilizing a trained neural network to select of a sub-portion of the object.

In addition, the digital selection system can select objects reflected in a digital image that are subparts of a larger object reflected in the digital image. For example, FIGS. 7A-7B illustrate selecting a subpart of a larger object based on iterative user indicators in accordance with one or more embodiments. In particular, FIG. 7A illustrates a probe digital image 700 portraying an individual 702 wearing a jacket 704. FIG. 7A illustrates that the digital selection system receives a positive user indicator 706 within the individual 702 and a negative user indicator 708 outside the individual 702. Based on the user indicators 706, 708, the digital selection system generates an object boundary 710 corresponding to the individual 702.

The digital selection system provides the object boundary 710 for display via a display device (not shown). In particular, the digital selection system provides the object boundary 710 for display to a user in conjunction with the probe digital image 700. Upon viewing the object boundary 710, the user provides additional user input (e.g., additional negative user indicators). In particular, FIG. 7B illustrates the probe digital image 700 with new negative user indicators 728a-728c. Notably, the new negative user indicators 728a-728c are within the individual 702, but outside the jacket 704. Based on the new negative user indicators 728a-728c, the digital selection system generates a new object boundary 720. More specifically, the digital selection system generates the new object boundary 720 encompassing the pixels reflecting the jacket 704.

Thus, as illustrated, the digital selection system can select an object that is a subpart (i.e., the jacket 704) of a larger object (i.e., the individual 702) reflected in a digital image (i.e., the probe digital image 700). The digital selection system generates modified object boundaries (i.e., the new object boundary 720) based on iterative user indicators provided by a user.

Furthermore, as mentioned previously, the digital selection system can receive a variety of types of user indicators. In particular, the digital selection system receives and recognizes different user inputs corresponding to a user indicator of pixels in a digital image. For example, as mentioned previously, the digital selection system can identify user input of a point corresponding to a pixel (e.g., a select and release event, a mouse click, or touch event on a touchscreen).

Figure 8A:
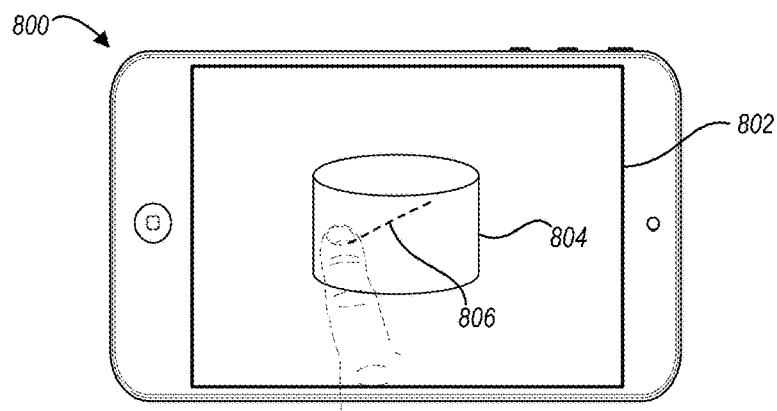
FIG. 8A illustrates a computing device displaying a digital image and illustrating a user indicator comprising a stroke, in accordance with one or more embodiments.

In addition to user input of a point, the digital selection system can also identify a user indicator based on user input of a stroke. For example, FIG. 8A illustrates the digital selection system receiving a user indicator via user input of a stroke in accordance with one or more embodiments. In particular, FIG. 8A illustrates a computing device 800 with a touchscreen 802 displaying a target object 804. As shown, the digital selection system can receive a stroke 806. In particular, the user provides user input of the stroke 806 by touching the touchscreen 802 with a finger 808, dragging the finger 808, and releasing the touchscreen 802.

In one or more embodiments, the digital selection system receives a user indicator of one or more pixels (e.g., pixels comprising a stroke) together with an indication of how the area corresponds to the target object. For instance, the stroke 806 reflects a positive user indicator with regard to the target object 804. In one or more embodiments, the digital selection system identifies that the stroke 806 is a positive user indicator. For example, the digital selection system receives an indication (e.g., a stroke provided with a left-mouse click) that a user indicator is a positive user indicator. The digital selection system can also receive a stroke together with an indication that the stroke is a negative user indicator. In particular, the digital selection system receives an indication that the area indicated by the stroke is outside the target object (e.g., a stroke entered with a right-mouse click).

Upon identifying a positive stroke and/or a negative stroke, the digital selection system selects a target object. In particular, the digital selection system treats a positive or negative stroke as a plurality of positive or negative clicks. The digital selection system transforms the user indicators into a distance map, and selects a target object utilizing a trained neural network, as discussed previously.

Figure 8B:
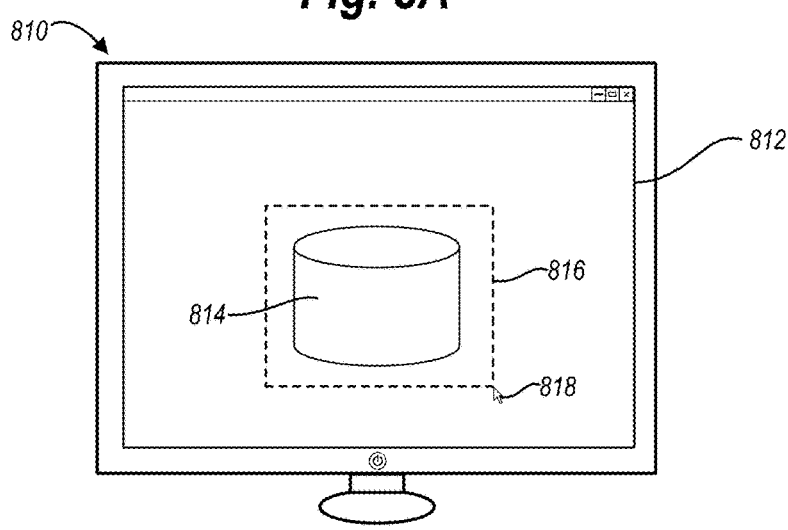
FIG. 8B illustrates a computing device displaying a digital image and illustrating a user indicator comprising a bounding box, in accordance with one or more embodiments.

Although the embodiment of FIG. 8A illustrates user input of the stroke 806 via a touchscreen, it will be appreciated that the digital selection system can receive user input of a stroke utilizing a variety of alternative methods (e.g., via a mouse select event, a mouse drag, and mouse release event). In addition to user input of a stroke, the digital selection system can also receive user indicators via user input of a bounding box. For example, FIG. 8B illustrates a computing device 810 with a display screen 812 displaying a target object 814. Moreover, FIG. 8B illustrates user input of a bounding box 816. In particular, FIG. 8B illustrates the bounding box 816 provide via user interaction with a mouse (e.g., via a mouse pointer 818 and mouse select, drag, and unselect events).

In particular, the user provides, via the bounding box 816, a user indicator of one or more pixels (e.g., pixels within the bounding box 816). Moreover, as with other user indicators, the digital selection system receives and recognizes positive user indicators and negative user indicators via a bounding box. For instance, in one or more embodiments a user can provide (and the digital selection system can identify) an indication that a bounding box encompasses or includes a target object. Similarly, in another embodiment, the user can provide (and the digital selection system can identify) an indication that a target object falls outside the bounding box (e.g., outside the area defined by the bounding box). Moreover, as mentioned previously, the digital selection system can transform pixels identified via a bounding box to a distance map. The digital selection system can utilize the distance map in conjunction with a trained neural network to identify pixels representing a target object.

Figure 8C:
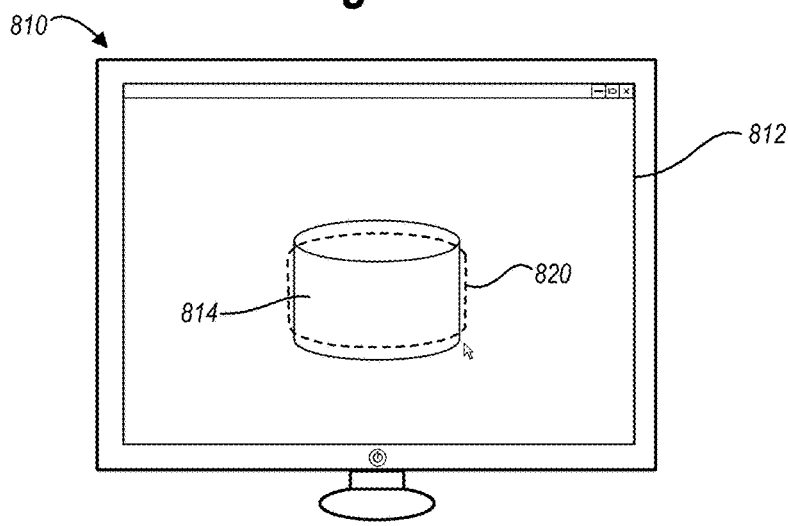
FIG. 8C illustrates a computing device displaying a digital image and illustrating a user indicator comprising a loose boundary, in accordance with one or more embodiments.

In addition to clicks, strokes, or bounding boxes, the digital selection system can also receive user indicators in the form of user input of a loose boundary (or other user input). For example, FIG. 8C illustrates the computing device 810 displaying the target object 814. In particular, FIG. 8C illustrates a loose boundary 820 provided via user interaction with a mouse (e.g., a series of mouse select, drag, and release events). In one or more embodiments, user input of a loose boundary provides an indication that a target object is near the loose boundary. Thus, the loose boundary 820 indicates that the target object is near the target object 814. Notably, part of the loose boundary 820 lies within the target object 814 and part of the loose boundary 820 lies outside the target object.

The digital selection system can utilize a loose boundary that falls inside a target object, outside a target object, or both to select a target object. In particular, the digital selection system transforms a loose boundary to a distance map. The digital selection system then utilizes the distance map in conjunction with a neural network trained with regard to loose boundaries to identify the target object 814.

As mentioned previously, the digital selection system can operate in conjunction with any type of digital visual media. In particular, the digital selection system can select a target object with regard to a digital video. In one or more embodiments, the digital selection system selects a target object in a first image/frame in a digital video to identify a corresponding modified target object in a second image/frame in the digital video. Specifically, the digital selection system utilizes an object boundary or mask generated with regard to a target object in a first digital image/frame as a user indicator of pixels with regard to a corresponding modified target object in a second image/frame. More specifically, the digital selection system utilizes the selected pixels belonging to a target object in a first digital image/frame to generate distance maps with regard to a corresponding modified target object in a second image/frame. Moreover, the digital selection system utilizes the generated distance maps to select the corresponding modified target object in the second image/frame.

Figure 9A:
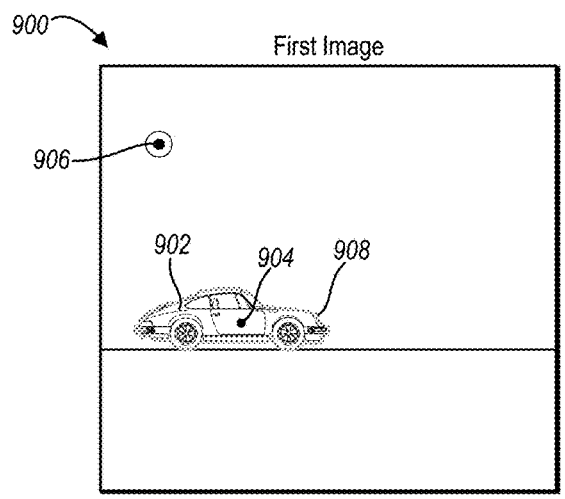
FIG. 9A illustrates a representation of a first frame of a digital video and selecting an object utilizing a trained neural network in accordance with one or more embodiments.
Figure 9B:
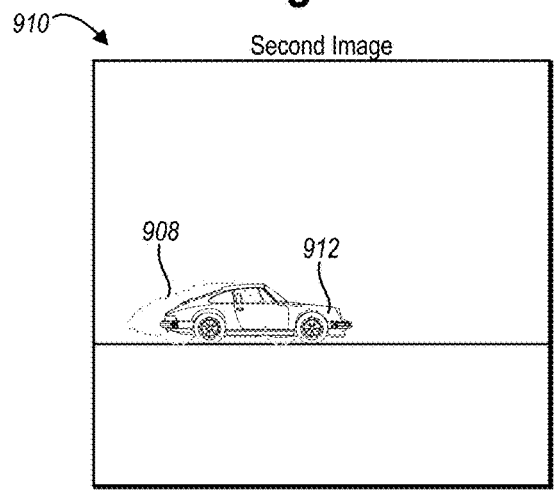
FIG. 9B illustrates a representation of a second frame of the digital video of FIG. 9A including a modified object in accordance with one or more embodiments.
Figure 9C:
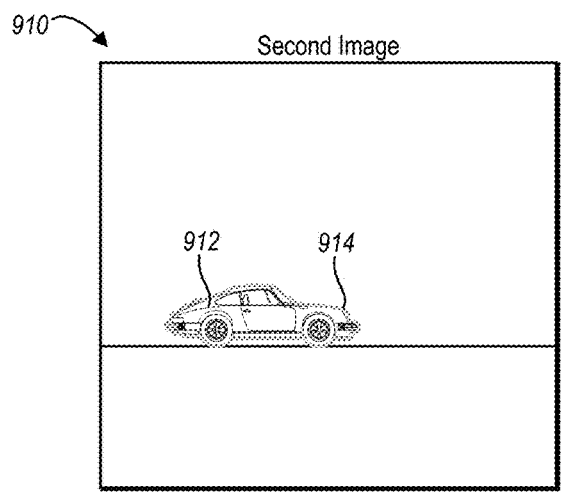
FIG. 9C illustrates a representation of the second frame of FIG. 9B and selecting the modified object of FIG. 9B in accordance with one or more embodiments.

For example, FIGS. 9A-9C illustrate selecting a target object in multiple frames of a digital video in accordance with one or more embodiments. In particular, FIG. 9A illustrates a first image/frame 900 in a digital video comprising a sequence of digital images/frames. Moreover, as shown, the first image/frame 900 reflects a target object 902. FIG. 9A also illustrates that the digital selection system receives a positive user indicator 904 and a negative user indicator 906. Based on the user indicators 904, 906 the digital selection system identifies an object boundary 908.

FIG. 9B illustrates a second image/frame 910 in the digital video. In particular, the second image/frame 910 reflects the next image in the sequence of digital images from the digital video. As illustrated, the target object 902 in the first image/frame 900 is now reflected as a modified target object 912 in the second image/frame 910. In particular, the modified target object 912 is located in a slightly different location than the target object 902.

As shown, the digital selection system utilizes the object boundary 908 to select the modified target object 912. In particular, the digital selection system utilizes the object boundary 908 as a user indicator with regard to the modified target object 912. The digital selection system treats the object boundary 908 as a loose boundary user indicator (e.g., similar to the embodiment of FIG. 8C) with regard to the modified target object 912, where the loose boundary provides an indication of an area (e.g., set of pixels) that is near the target object.

Thus, with regard to the embodiment of FIG. 9B, the digital selection system generates a distance map utilizing the object boundary 908 with regard to the modified target object 912. The digital selection system generates an image/user interaction pair and provides the image/user interaction pair to a trained neural network. Utilizing the trained neural network, the digital selection system can select the modified target object 912.

In particular, FIG. 9C illustrates the modified target object 912 with an object boundary 914. Specifically, FIG. 9C illustrates the object boundary 914 as generated by the digital selection system based on the object boundary 908. In this manner, the digital selection system identifies target objects in sequential images/frame utilizing a trained neural network.

As mentioned above, one or more embodiments of the digital selection system provide more accurate selections with fewer user indicators. To illustrate one or more advantages of the digital selection system, experimenters have conducted research to show that the digital selection system produces more accurate selections. In particular, experimenters trained a neural network in accordance with the digital selection system, utilized the neural network to select target objects in digital images, utilized other object selection systems to select target objects in digital images, and compared the results obtained from other object selection systems and the digital selection system.

Specifically, experimenters fine-tuned a fully convolutional neural network utilizing 1464 training images from the PASCAL VOC 2012 segmentation database. Training parameters for the neural network were set as follows:

$$N_{neg1}=10, N_{neg2}=10, N_{neg3}=5, d=40$$

Experimenters compared results obtained from this trained neural network to other popular object selection systems. In particular, because other algorithms cannot estimate with a single click, experimenters enlarged every click to a large dot with a radius of 5. Experimenters used such large dots for graph cut refinement but only single clicks for the fully convolutional neural network models. To evaluate, experimenters recorded the updated IU accuracy of an object given sequential clicks, which were automatically generated as described above with regard to FIGS. 2A-2C. The maximum number of clicks on a single object was limited to 20. Experimenters also recorded how many clicks were required to achieve a certain IU accuracy for the object. If the IU accuracy could not be achieved in 20 clicks, experimenters thresholded the accuracy at 20. Finally, experimenters averaged each metric over all objects in the dataset.

Experimenters evaluated algorithms on four public datasets: Pascal VOC 2012 segmentation validation set, Grabcut, Berkeley, and MS COCO (for both seen categories and unseen categories). The experimental results of IU accuracy across clicks are illustrated in FIG. 10.

Figure 10:
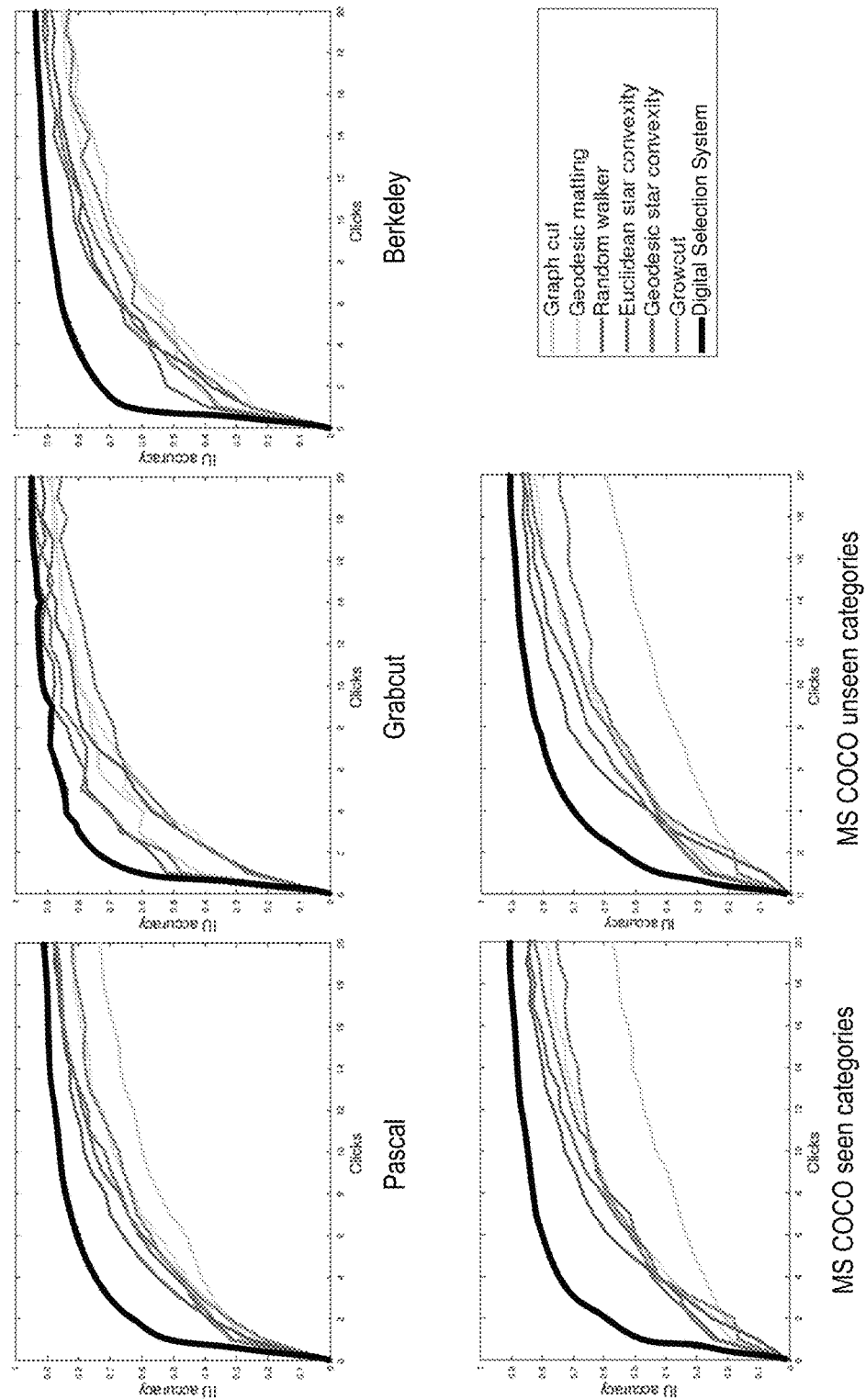
FIG. 10 illustrates a representation of a plurality of graphs showing results of experimentation conducted with regard to an embodiment of the digital selection system.

As shown in FIG. 10, the digital selection system provides more accurate results across all tested datasets. In particular, as illustrated in FIG. 10, for almost any number of clicks (across all datasets), the digital selection system achieved a higher accuracy than other object selection systems.

Similarly, the experiment revealed that the digital selection system also achieves threshold levels of accuracy with fewer clicks. In particular, the experimental results of the number of clicks required to achieve a certain IU accuracy are shown in Table 1. As illustrated, the digital selection system achieves IU accuracy thresholds with significantly fewer clicks than other object selection systems.

TABLE 1

| Model | Pascal (85% IU) | Grabcut (90% IU) | Berkeley (90% IU) | MS COCO seen (85% IU) | MS COCO unseen (85% IU) |
| --- | --- | --- | --- | --- | --- |
| Graph cut | 15.06 | 11.10 | 14.33 | 18.67 | 17.80 |
| Geodesic matting | 14.75 | 12.44 | 15.96 | 17.32 | 14.86 |
| Random walker | 11.37 | 12.40 | 14.02 | 13.91 | 11.53 |
| Euclidean start convexity | 11.79 | 8.52 | 12.11 | 13.90 | 11.63 |
| Geodesic start convexity | 11.73 | 8.38 | 12.57 | 14.37 | 12.45 |
| Growcut | 14.56 | 16.74 | 18.25 | 17.40 | 17.34 |
| Digital Selection System | 6.88 | 6.04 | 8.65 | 8.31 | 7.82 |

Experimenters also compared the digital selection system to other deep learning models (even though those models fail to support iterative selections based on user interaction). To compare such models, experimenters designed a strategy such that the connected component of a given label that contains a user click is taken as a target object and other areas are treated as background. It is not straightforward how to respond to negative clicks with regard to these other systems, therefore experimenters only compared results by a single positive click. Table 2 presents the mean IU accuracy with a single positive click on the MS COCO dataset.

TABLE 2

| Model | MS COCO seen | MS COCO unseen |
| --- | --- | --- |
| FCN | 42.37% | 16.14% |
| CRF RNN | 47.01% | 13.28% |
| Digital Selection System | 48.35% | 42.94% |

As shown in Table 2, for unseen classes, the digital selection system performs significantly better, proving both the ability to generalize to new classes and the effectiveness of the digital selection system in combining user interactions with deep learning techniques. For seen categories, Table 2 shows more modest improvement. However, it will be appreciated that the digital selection system was given only one click, and with more clicks the digital selection system can greatly improve results.

In sum, the digital selection system provides improved accuracy with fewer clicks over other object selection systems. The digital selection system achieves these results by generically training a neural network to select target objects based on iterative user indicators.

Figure 11:
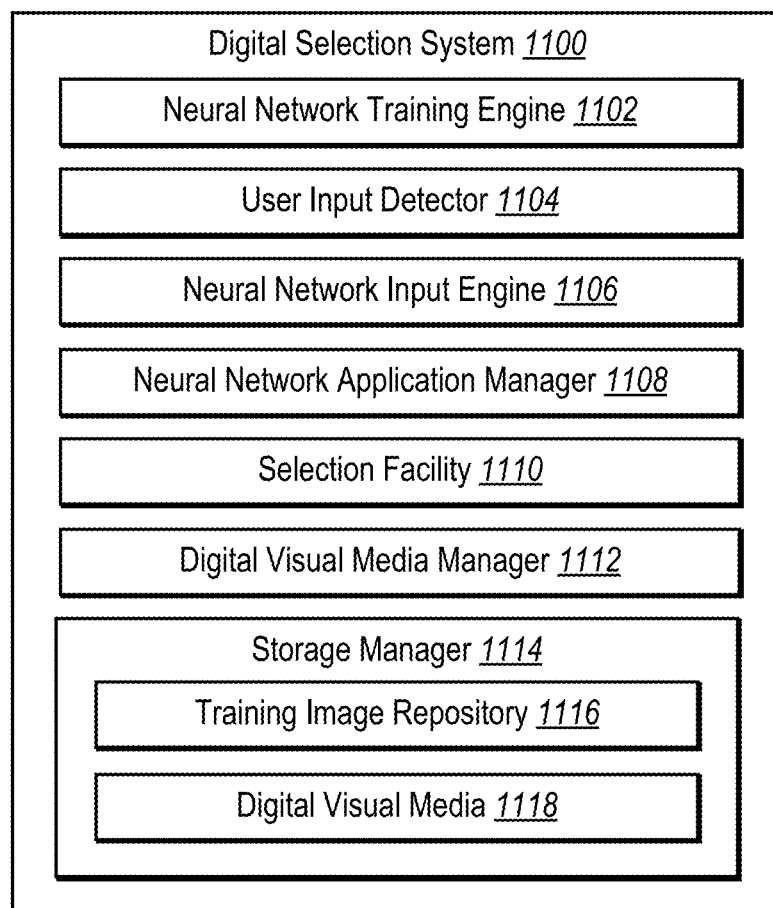
FIG. 11 illustrates a schematic diagram of a digital selection system in accordance with one or more embodiments.

Turning now to FIG. 11, additional detail will be provided regarding components and capabilities of one example architecture of a digital selection system according to one or more embodiments. In particular, FIG. 11 illustrates an embodiment of an exemplary digital selection system 1100 (e.g., "digital selection system," described above). As shown, the digital selection system 1100 may include, but is not limited to, a neural network training engine 1102, a user input detector 1104, a neural network input engine 1106, a neural network application manager 1108, a selection facility 1110, a digital visual media manager 1112, and a storage manager 1114. Moreover, the storage manager 1114 may also include training image repository 1116 and digital visual media 1118.

As illustrated in FIG. 11, the digital selection system 1100 includes the neural network training engine 1102. The neural network training engine 1102 can teach, guide, tune, and/or train one or more neural networks. In particular, the neural network training engine 1102 can train a neural network based on a plurality of digital training images (e.g., images from the training image repository 1116). Moreover, in one or more embodiments, the neural network training engine 1102 can generate training indicators with regard to digital training images.

The neural network training engine 1102 can train any type or variety of neural network (e.g., a variety of machine learning algorithms). As discussed above, in one or more embodiments, the neural network training engine 1102 trains a convolutional neural network (CNN) and/or fully convolutional neural network (FCN) to identify object boundaries corresponding to one or more target objects in digital images.

As mentioned, the neural network training engine 1102 can train a neural network utilizing digital training images. Accordingly, in one or more embodiments, the neural network training engine 1102 accesses one or more repositories of digital training images. In particular, the neural network training engine 1102 can access repositories of digital training images where objects portrayed in the digital training images are defined by training object data. For example, the neural network training engine 1102 can access repositories of digital training images containing objects with known object boundaries or ground truth masks.

In addition, the neural network training engine 1102 can sample training indicators from digital training images. As discussed above, the neural network training engine 1102 can generate training indicators to model user input with regard to target objects in digital images. More specifically, the neural network training engine 1102 can generate positive training indicators (e.g., representing positive clicks) negative training indicators (e.g., representing negative clicks), or proximity training indicators (e.g., representing user input of a loose boundary in close proximity to a target object).

The neural network training engine 1102 can utilize a variety of sampling methods to generate training indicators. For example, the neural network can randomly sample training indicators (e.g., from an area within a target object, from an area within an untargeted object, from an area outside of a target object, or from an area in the vicinity of a target object). In addition, the neural network can sample training indicators based on the location (or distance to) or other training indicators (e.g., the neural network can sample positive training indicators such that they are spread across a target object in relation to other positive training indicators, sample negative training indicators such that they are spread around a target object in relation to other negative training indicators, or sample negative training indicators such that they are spread across an untargeted object in relation to other negative training indicators).

In one or more embodiments, the neural network training engine 1102 utilizes training indicators to generate a trained neural network. In particular, in one or more embodiments the neural network training engine 1102 transforms training indicators into distance maps (e.g., maps reflecting the distance between pixels in the digital training image and indicated pixels). Moreover, in one or more embodiments, the neural network training engine 1102 combines distance maps and color channels to form image/user interaction pairs with regard to target objects in digital training images. Furthermore, in one or more embodiments, the neural network training engine 1102 provides image/user interaction training pairs to a neural network with training object data (e.g., object boundaries or ground truth masks of identified objects) to train the neural network to select target objects.

As mentioned above, the neural network training engine 1102 can tune a neural network across a variety of stride value models. For example, in one or more embodiments the neural network training engine 1102 trains a stride-32 model utilizing digital training images. Moreover, in one or more embodiments, the neural network training engine 1102 trains a stride-16 model utilizing digital training images and the stride-32 model. In addition, in one or more embodiments, the neural network training engine 1102 trains a stride-8 model utilizing digital training images and the stride-16 model.

As described above, the neural network training engine 1102 can train a neural network to select digital objects based on a variety of training indicator types. For instance, the neural network training engine 1102 can train a neural network to select digital objects based on user input of a click of a pixel, user input of a stroke, user input of a bounding box, or user input of a loose boundary.

As illustrated in FIG. 11, the digital selection system 1100 also includes the user input detector 1104. The user input detector 1104 can obtain, identify, receive, monitor, capture, and/or detect user input. For example, in one or more embodiments, the user input detector 1104 identifies one or more user interactions with respect to a user interface. As used herein, a "user interaction" refers to conduct performed by a user (or a lack of conduct performed by a user) to control the function of a computing device. "User input," as used herein, refers to input data generated in response to a user interaction. The user input detector 1104 can operate in conjunction with any number of user input devices or computer devices (in isolation or in combination), including personal computers, laptops, smartphones, smart watches, tablets, touch screen devices, televisions, personal digital assistants, mouse devices, keyboards, track pads, or stylus devices. Similarly, the user input detector 1104 can identify or detect a user interaction with respect to a variety of user interface elements, such as selection of a graphical button or a drag event within a graphical object. The user input detector 1104 can communicate with, and thus receive user input with respect to, a variety of programs, applications, plug-ins, operating systems, user interfaces, or other implementations in software or hardware.

The user input detector 1104 can detect user input of one or more user indicators. In particular, the user input detector 1104 can detect user input of user indicators with regard to one or more pixels in a digital image. For example, in one or more embodiments, the user input detector 1104 detects user input of a point or pixel in a digital image (e.g., a mouse click event or a touch event on a touchscreen). Similarly, in one or more embodiments, the user input detector 1104 detects user input of a stroke (e.g., mouse click, drag, and release events). In one or more embodiments, the user input detector 1104 detects user input of a bounded area (e.g., mouse click, drag, and release events). In addition, in one or more embodiments, the user input detector 1104 detects user input of a loose boundary (e.g., a plurality of mouse click and drag events).

In addition to the user input detector 1104, as illustrated in FIG. 11, the digital selection system 1100 also includes the neural network input engine 1106. The neural network input engine 1106 can identify, gather, transform, prepare, create, generate and/or provide input to a trained neural network. The neural network input engine 1106 can generate and provide image/user interaction pairs to a trained neural network.

In one or more embodiments, the neural network input engine 1106 determines an indication of how a user indicator corresponds to a target object. For instance, the neural network input engine 1106 identifies user input of a user indicator, and determine whether the input indicates a positive user indicator (e.g. an indication that an area corresponding to the user indicator falls within a target object), a negative user indicator (e.g., an indication that a target object falls outside an area corresponding to the user indicator) or a proximity user indicator (e.g., an indication that an object boundary corresponding to a target object is in close proximity to an area corresponding to the user indicator). For example, in one or more embodiments, the neural network input engine 1106 identifies a right-click and determine an indication that the right click corresponds to a negative user indicator of a pixel outside a target object.

Moreover, in one or more embodiments, the neural network input engine 1106 transforms user input of user indicators (e.g., a click of a pixel in a digital image) into distance maps. In particular, in one or more embodiments, the neural network input engine 1106 generates distance maps that reflect distances between pixels in a digital image and one or more user indicators. More specifically, in one or more embodiments, the neural network input engine 1106 transforms user input of user indicators into matrices that reflect the distance between each pixel in a digital image and the nearest indicated pixel.

The neural network input engine 1106 can generate multiple distance maps. For example, the neural network input engine 1106 generates positive distance maps (e.g., distance maps reflecting distances to positive user indicators) and/or negative distance maps (e.g., distance maps reflecting distances to negative user indicators). Moreover, in one or more embodiments, the neural network input engine 1106 generates a positive distance map for each digital image having one or more positive user indicators and generates a negative distance map for each digital image having one or more negative user indicators.

The neural network input engine 1106 can also combine distance maps and color channels to provide input to a neural network. For example, in one or more embodiments, the neural network input engine 1106 combines distance maps and color channels corresponding to a digital image to generate an image/user interaction pair (e.g., a data set pairing image data reflected by color channels and user interaction data reflected by distance maps).

The neural network input engine 1106 can also utilize one or more color channels. In one or more embodiments, the neural network input engine 1106 utilizes color channels reflecting the color of each pixel in a digital image. In particular, in one or more embodiments, the neural network input engine 1106 utilizes a red color channel, a green color channel, and a blue color channel. In other embodiments, the neural network input engine 1106 utilizes four color channels (e.g., in analyzing a CMYK image, utilizing a color channel for cyan, magenta, yellow, and black). Similarly, in one or more embodiments, the neural network input engine 1106 utilizes a single color channel (e.g., in analyzing a gray scale image).

The neural network input engine 1106 can also utilize information generated by an algorithm or tool (e.g., an object boundary generated by the selection facility 1110) as input to a neural network. For example, with regard to digital videos, the neural network input engine 1106 receives an object boundary identified with regard to a target object in a first image in a video sequence and utilize the object boundary to generate input to a neural network in identifying a second object boundary for a corresponding target object in a second image. For example, in one or more embodiments, the neural network input engine 1106 utilizes the object boundary from the first image as a user indicator (e.g. a loose boundary user indicator indicating that the corresponding target object in the second image is in close proximity) and generates a distance map utilizing the object boundary.

In addition to the neural network input engine 1106, as shown in FIG. 11, the digital selection system 1100 also includes the neural network application manager 1108. The neural network application manager 1108 can apply, utilize, and/or provide a trained neural network with regard to one or more inputs. For instance, in one or more embodiments, the neural network application manager 1108 receives input (e.g., image/user interaction pairs from the neural network input engine 1106) and generates information that enables selection of a target object. In particular, in one or more embodiments, the neural network application manager 1108 generates a probability map corresponding to a target object.

The neural network application manager 1108 can utilize any trained neural network. For example, in one or more embodiments, the neural network application manager 1108 utilizes a trained neural network generated by the neural network training engine 1102. Thus, in one or more embodiments, the neural network application manager 1108 utilizes a fully convolutional neural network to generate information that enables selection of a target object (e.g., via the selection facility 1110).

The neural network application manager 1108 can receive any type or variety of input. As just mentioned, in one or more embodiments, the neural network application manager 1108 can receive and apply a trained neural network to image/user interaction pairs. In one or more embodiments, the neural network application manager 1108 receives and applies a trained neural network to two distance maps and three color channels.

In addition, as just mentioned, the neural network application manager 1108 can generate information that enables selection of a target object. In one or more embodiments, the neural network application manager 1108 generates a probability map. The neural network application manager 1108 generates a probability map reflecting the likelihood that pixels in a digital image belong to a target object in the digital image.

Furthermore, as illustrated in FIG. 11, the digital selection system 1100 also includes the selection facility 1110. The selection facility 1110 can utilize information from other components of the digital selection system 1100 (e.g., information provided via the neural network application manager 1108) to identify or select one or more target objects. In particular, the selection facility 1110 can generate, create, calculate, determine, and/or provide a set of pixels that reflect a target object (e.g., an object boundary or mask).

As mentioned previously, in one or more embodiments, the selection facility 1110 applies one or more thresholds to a probability map to select a target object. For example, the selection facility 1110 can apply a minimum probability threshold to a probability map, and identify pixels that belong to a target object based on the pixels that exceed the minimum probability threshold.

In other embodiments, the selection facility 1110 utilizes additional tools or algorithms to select target objects. For instance, as described above, in one or more embodiments, the selection facility 1110 utilizes graph cuts optimization to generate an object boundary (or mask). In particular, the selection facility 1110 utilizes graph cuts optimization to generate an object boundary (or mask) based on a probability map (e.g., probability map generated by the neural network application manager 1108).

The selection facility 1110 can also identify pixels belonging to target objects for modification by additional components, tools, or systems. For example, the selection facility 1110 can identify a set of pixels belonging to a target object (e.g., utilizing an object boundary) and provide the set of pixels to the digital visual media manager 1112. Indeed, as just mentioned and as illustrated in FIG. 11, the digital selection system 1100 includes the digital visual media manager 1112. The digital visual media manager 1112 can access, identify, modify, revise, and/or provide digital visual media.

In particular, the digital visual media manager 1112 can modify digital visual media or a portion of digital visual media. For example, in one or more embodiments, the digital visual media manager 1112 alters color, brightness, hue, or any other visual characteristic of digital visual media. Similarly, the digital visual media manager 1112 can move, resize, rotate, or orient digital visual media or an object reflected in digital visual media. Similarly, the digital visual media manager 1112 can isolate, cut, and paste digital visual media (or portions of digital visual media). Moreover, the digital visual media manager can delete or remove digital visual media (or portions of digital visual media).

Furthermore, the digital visual media manager 1112 can receive selection information identifying a target object (e.g., from the selection facility 1110) and modify the target object. Thus, the digital visual media manager 1112 can modify a target object in a digital image. Similarly, the digital visual media manager 1112 can modify a target object in a digital video. Moreover, the digital visual media manager 1112 can modify a target object reflected in a plurality of frames (e.g., digital images) in a video sequence. For instance, the selection facility 1110 can provide information identify pixels belonging to a target object portrayed in multiple frames of a digital video, and the digital visual media manager 1112 can modify (e.g., change appearance or remove) the target object from the multiple frames.

As illustrated in FIG. 11, the digital selection system 1100 also includes the storage manager 1114. The storage manager 1114 maintains data for the digital selection system 1100. The storage manager 1114 can maintain data of any type, size, or kind as necessary to perform the functions of the digital selection system 1100. The storage manager 1114, as shown in FIG. 11, includes training image repository 1116. The training image repository 1116 can include a plurality of digital training images. In particular, in one or more embodiments, the training image repository 1116 includes digital training images utilized by the neural network training engine 1102 to train one or more neural networks. The training image repository 1116 can include any type or variety of digital image.

In addition to digital images, the training image repository 1116 can also include training object data. For example, the training image repository 1116 includes training object data with regard to target objects or untargeted objects. Specifically, the training image repository 1116 can include object boundaries or ground truth masks corresponding to objects within digital training images.

As illustrated in FIG. 11, the storage manager 1114 also includes digital visual media 1118. Digital visual media 1118 can include any digital visual media (e.g., digital images or digital video) utilized by the digital selection system 1100. For example, digital visual media 1118 includes digital visual media provided by a user, where the user seeks to select a target object portrayed in the digital visual media.

Digital visual media 1118 can also include information generated by the digital selection system 1100 regarding visual media. For instance, digital visual media 1118 includes distance maps, color channels, metadata, or other information regarding digital images or digital video utilized by the digital selection system 1100.

In addition, digital visual media 1118 can also include data regarding objects portrayed in visual media. For instance, digital visual media 1118 includes information regarding target objects or untargeted objects. Specifically, in one or more embodiments, digital visual media 1118 includes object boundaries corresponding to objects, ground truth masks corresponding to objects, or other information corresponding to objects reflected in visual media.

Each of the components 1102-1114 of the digital selection system 1100 and their corresponding elements (as shown in FIG. 11) may be in communication with one another using any suitable communication technologies. It will be recognized that although components 1102-1114 and their corresponding elements are shown to be separate in FIG. 11, any of components 1102-1114 and their corresponding elements may be combined into fewer components, such as into a single facility or module, divided into more components, or configured into different components as may serve a particular embodiment.

The components 1102-1114 and their corresponding elements can comprise software, hardware, or both. For example, the components 1102-1114 and their corresponding elements can comprise one or more instructions stored on a computer-readable storage medium and executable by processors of one or more computing devices. When executed by the one or more processors, the computer-executable instructions of the digital selection system 1100 can cause a client device and/or a server device to perform the methods described herein. Alternatively, the components 1102-1114 and their corresponding elements can comprise hardware, such as a special purpose processing device to perform a certain function or group of functions. Additionally or alternatively, the components 1102-1114 and their corresponding elements can comprise a combination of computer-executable instructions and hardware.

Furthermore, the components 1102-1114 of the digital selection system 1100 may, for example, be implemented as one or more stand-alone applications, as one or more modules of an application, as one or more plug-ins, as one or more library functions or functions that may be called by other applications, and/or as a cloud-computing model. Thus, the components 1102-1114 of the digital selection system 1100 may be implemented as a stand-alone application, such as a desktop or mobile application. Furthermore, the components 1102-1114 of the digital selection system 1100 may be implemented as one or more web-based applications hosted on a remote server. Alternatively or additionally, the components of the digital selection system 1100 may be implemented in a suit of mobile device applications or "apps." To illustrate, the components of the digital selection system 1100 may be implemented in a digital image editing application, including but not limited to ADOBE® PHOTOSHOP® or ADOBE® REVEL®. "ADOBE®," "ADOBE® PHOTSHOP®," and "ADOBE® REVEL®" are either registered trademarks or trademarks of Adobe Systems Incorporated in the United States and/or other countries.

Figure 12:
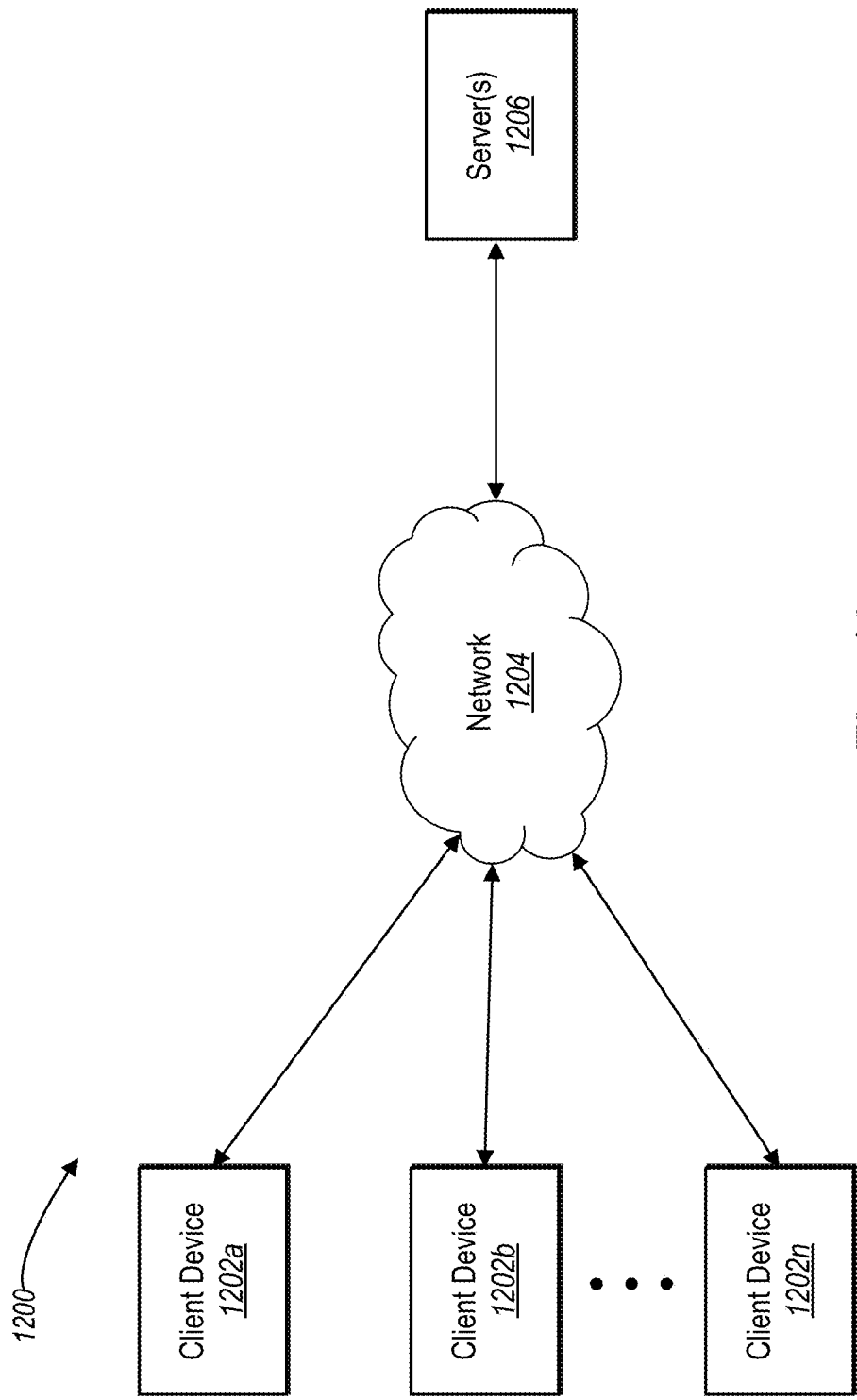
FIG. 12 illustrates a schematic diagram of an exemplary environment in which the digital selection system can operate in accordance with one or more embodiments.

FIG. 12 illustrates a schematic diagram of one embodiment of an exemplary environment 1200 in which the digital selection system 1100 can operate. In one or more embodiments, the environment 1200 includes a server 1206 connected to a plurality of client devices 1202a-1202n via a network 1204. The client devices 1202a-1202n, the network 1204, and the server 1206 may communicate with each other or other components using any communication platforms and technologies suitable for transporting data and/or communication signals, including any known communication technologies, devices, media, and protocols supportive of remote data communications, examples of which will be described in more detail below with respect to FIG. 15.

Although FIG. 12 illustrates a particular arrangement of the client devices 1202a-1202n, the network 1204, and the server 1206, various additional arrangements are possible. For example, the client devices 1202a-1202n may directly communicate with the server 1206, bypassing the network 1204. Or alternatively, the client devices 1202a-1202n may directly communicate with each other.

Similarly, although the environment 1200 of FIG. 12 is depicted as having various components, the environment 1200 may have additional or alternative components. For example, the environment 1200 can be implemented on a single computing device with the digital selection system 1100. In particular, the digital selection system 1100 may be implemented in whole or in part on the client device 1202a.

As illustrated in FIG. 12, the environment 1200 may include client devices 1202a-1202n. The client devices 1202a-1202n may comprise any computing device. For example, client devices 1202a-1202n may comprise one or more personal computers, laptop computers, mobile devices, mobile phones, tablets, special purpose computers, TVs, or other computing devices, including computing devices described below with regard to FIG. 15. Although three client devices are presented with regard to FIG. 12, it will be appreciated that client devices 1202a-1202n may comprise any number of client devices (greater or smaller than shown).

Moreover, as illustrated in FIG. 12, the client devices 1202a-1202n and server 1206 may communicate via the network 1204. The network 1204 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 1204 may be any suitable network over which the client devices 1202a-1202n may access the server 1206, or vice versa. The network 1204 will be discussed in more detail below with regard to FIG. 15.

In addition, the environment 1200 may also include the server 1206. The server 1206 may generate, store, receive, and transmit any type of data, including training image repository 1016, digital visual media 1018, or other information. For example, the server 1206 may receive data from a client device, such as the client device 1202a, and send the data to another client device, such as the client device 1202b, 1202c, and/or 1202n. The server 1206 can also transmit electronic messages between one or more users of the environment 1200. In one example embodiment, the server 1206 is a data server. The server 1206 can also comprise a communication server or a web-hosting server. Additional details regarding the server 1206 will be discussed below with respect to FIG. 15.

As mentioned, in one or more embodiments, the server 1206 can include or implement at least a portion of the digital selection system 1100. In particular, the digital selection system 1100 can comprise an application running on the server 1206 or a portion of the digital selection system 1100 can be downloaded from the server 1206. For example, the digital selection system 1100 can include a web hosting application that allows the client devices 1202a-1202n to interact with content hosted at the server 1206. To illustrate, in one or more embodiments of the environment 1200, one or more client devices 1202a-1202n can access a webpage supported by the server 1206. In particular, the client device 1202a can run a web application (e.g., a web browser) to allow a user to access, view, and/or interact with a webpage or website hosted at the server 1206.

Upon the client device 1202a accessing a webpage hosted at the server 1206, in one or more embodiments, the server 1206 can provide access to digital visual media (e.g., the digital visual media 1118) stored at the server 1206. Moreover, the client device 1202a can receive user interactions with regard to the digital visual media (e.g., via user input detector 1104) and provide user input to the server 1206. The server 1206 can utilize the user input to identify positive or negative user indicators (e.g., via the neural network input engine 1106) with regard to the digital visual media. Moreover, the server 1206 can transform (e.g., via the neural network input engine 1106) the positive and/or negative user indicators to input data for a trained neural network. In addition, the server can apply a trained neural network to the input data (e.g., via the neural network application manager 1108) and identify a set of pixels reflecting a target object (e.g., via the selection facility 1110). The server 1206 can provide the set of pixels (e.g., an object boundary or mask) to the client device 1202a for display to the user. The user can provide additional user input via the client device 1202a and the server 1206 can generate a modified set of pixels reflecting the target object (e.g., a modified object boundary or mask). Moreover, the user can provide user input via the client device 1202a indicating modifications to the target object. The server 1206 (e.g., via the digital visual media manager 1112) can modify the target object (e.g., cut and paste the target object).

By way of an additional example, in one or more embodiments, the server 1206 generates a trained neural network (e.g., via the neural network training engine 1002) and provides the trained neural network to the client device 1202a. In particular, the server 1206 embeds the trained neural network in a digital image editing application installed on the client device (i.e., ADOBE PHOTOSHOP). In one or more embodiments, the client device 1202a receives one or more user indicators with regard to a digital image. Specifically, the client device 1202a receives user indicators via the digital image editing application (e.g., via the user input detector 1004), and utilizes the embedded, trained neural network to select a target object in a probe digital image (e.g., via the neural network input engine 1006, the neural network application manager 1006, and the selection facility 1010). Moreover, upon selecting the target object, the client device 1202a can modify (e.g., move, copy, paste, or delete) the target object based on additional user input (e.g., utilizing the digital visual media manager 1012).

As just described, the digital selection system 1100 may be implemented in whole, or in part, by the individual elements 1202a-1206 of the environment 1200. It will be appreciated that although certain components of the digital selection system 1100 are described in the previous example with regard to particular elements of the environment 1200, various alternative implementations are possible. For instance, in one or more embodiments, the digital selection system 1100 is implemented on the client device 1202a. Similarly, in one or more embodiments, the digital selection system 1100 may be implemented on the server 1206. Moreover, different components and functions of the digital selection system 1100 may be implemented separately among client devices 1202a-1202n, the server 1206, and the network 1204. For instance, in one or more embodiments the neural network training engine 1102 is implemented as part of the server 1206; the user input detector 1104 is implemented as part of the client devices 1202a-1202n and the server 1206; the neural network input engine 1106 is implemented as part of the client devices 1202a-1202n and the server 1206; the neural network application manager 1108 is implemented as part of the client devices 1202a-1202n and the server 1206; the selection facility 1110 is implemented as part of the client devices 1202a-1202n and the server 1206; the digital visual media manager is implemented as part of the client devices 1202a-1202n and the server 1206; and the storage manager 1114 is implemented as part of the client devices 1202a-1202n and the server 1206. The environment 1200 can also be implemented in a variety of additional or alternative arrangements.

Moreover, the digital selection system 1100 and/or server 1206 can actively collect information independently of a particular client device and independent of other components of the environment 1200. For example, the digital selection system 1100 and/or server 1206 can actively collect information from interaction between users and the server 1206 (or other servers). Specifically, in one or more embodiments, the digital selection system 1100 actively collects digital visual media 1218. For example, the digital selection system 1100 can actively collect object boundaries (or masks) identified based on user indicators by one or more users with regard to digital visual media. Accordingly, the digital selection system 1100 can actively collect object boundaries (or masks), digital visual media, user indicators or other data utilized by the digital selection system 1100. Moreover, the digital selection system 1100 can utilize collected information (e.g., object boundaries, masks, digital images, or user indicators) to train a neural network (e.g., as part of a repository of electronic documents).

Figure 13:
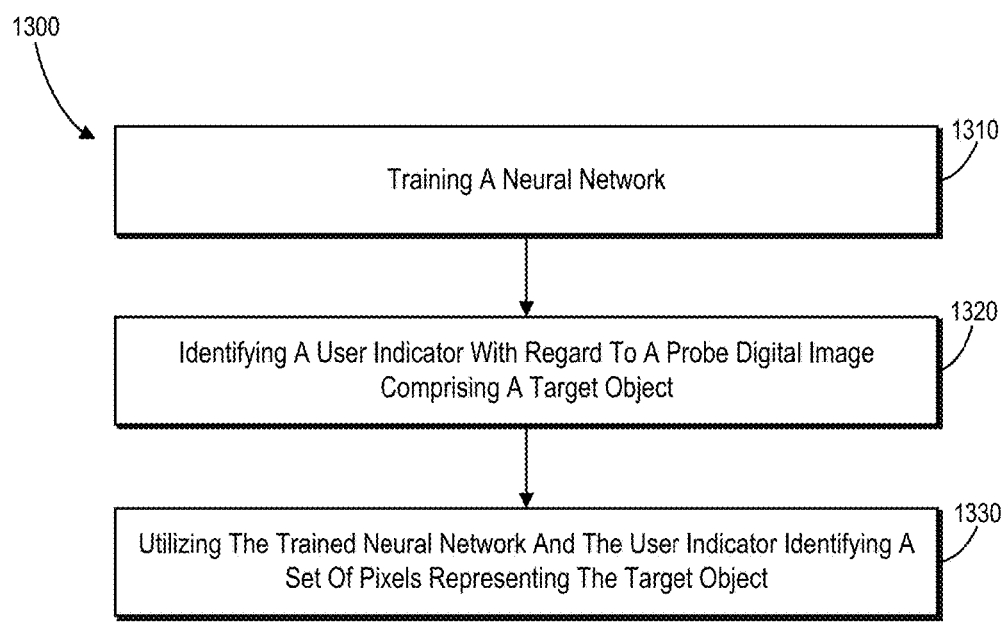
FIG. 13 illustrates a flowchart of a series of acts in a method of selecting an object within digital visual media in accordance with one or more embodiments.
Figure 14:
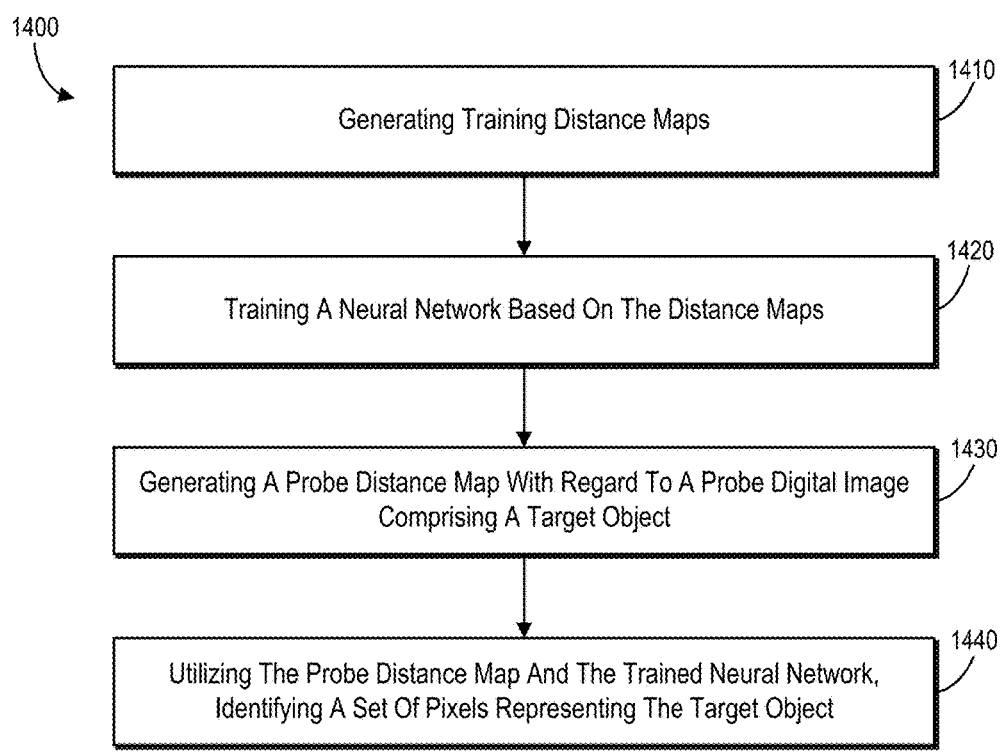
FIG. 14 illustrates another flowchart of a series of acts in a method of selecting an object within digital visual media in accordance with one or more embodiments.

FIGS. 1A-12, the corresponding text, and the examples, provide a number of different systems and devices that allows a user to facilitate selection of objects within digital visual media. In addition to the foregoing, embodiments can also be described in terms of flowcharts comprising acts and steps in a method for accomplishing a particular result. For example, FIGS. 13-14 illustrates flowcharts of exemplary methods in accordance with one or more embodiments of the present invention. The methods described in relation to FIGS. 13-14 may be performed with less or more steps/acts or the steps/acts may be performed in differing orders. Additionally, the steps/acts described herein may be repeated or performed in parallel with one another or in parallel with different instances of the same or similar steps/acts.

FIG. 13 illustrates a flowchart of a series of acts in a method 1300 of selecting digital objects in accordance with one or more embodiments of the present invention. In one or more embodiments, the method 1300 is performed in a digital medium environment that includes the digital selection system 1100. The method 1300 is intended to be illustrative of one or more methods in accordance with the present disclosure, and is not intended to limit potential embodiments. Alternative embodiments can include additional, fewer, or different steps than those articulated in FIG. 13.

As illustrated in FIG. 13, the method 1300 includes an act 1310 of training a neural network. In particular, the act 1310 can include training, by at least one processor, a neural network utilizing a repository of digital training images and training indicators, the digital training images comprising identified target objects, and the training indicators comprising pixels of the digital training images.

In addition, in one or more embodiments, the act 1310 includes generating a training distance map for a digital training image from the repository of digital training images, wherein the digital training image comprises an identified target object, wherein the digital training image corresponds to a training indicator comprising an indicated pixel of the digital training image, and wherein the training distance map comprises distances between pixels in the digital training image and the indicated pixel.

Furthermore, in one or more embodiments of the method 1300, training the neural network comprises providing the neural network with a positive training distance map, a negative training distance map, and a color channel, wherein the positive training distance map reflects a distance between a pixel in a digital training image and a positive training indicator, the negative training distance map reflects a distance between a pixel in the digital training image and a negative training indicator, and the color channel reflects a color of a pixel in the digital training image.

As illustrated in FIG. 13, the method 1300 also includes an act 1320 of identifying a user indicator with regard to a probe digital image comprising a target object. In particular, the act 1320 can include identifying a user indicator with regard to a probe digital image, the user indicator comprising one or more indicated pixels of the probe digital image and an indication of how the one or more indicated pixels correspond to a target object represented in the probe digital image. For instance, in one or more embodiments, the act 1320 includes generating a probability map utilizing the trained neural network based on the user indicator, the probability map comprising values that reflect the likelihood that the set of pixels correspond to the target object. Moreover, the act 1320 can include comparing one or more values of the probability map to a threshold.

In addition, in one or more embodiments of the method 1300, the user indicator comprises at least one of the following: user input of a point corresponding to a pixel, user input of a stroke corresponding to a plurality of pixels, user input of a bounding box encompassing a plurality of pixels, or user input of a loose boundary corresponding to a plurality of pixels.

Moreover, in one or more embodiments of the method 1300, the indication of how the one or more pixels correspond to the target object in the probe digital image comprises at least one of the following: an indication that the target object in the probe digital image is encompassed by the one or more pixels, an indication that the one or more pixels are within the target object in the probe digital image, an indication that the one or more pixels are outside the target object in the probe digital image, or an indication that the one or more pixels are near the target object in the probe digital image.

Similarly, in one or more embodiments of the method 1300, user indicators further comprise a positive training indicator, the positive training indicator comprising at least one pixel of a digital training image, wherein the digital training image comprises a target object, and the at least one pixel is part of the target object; and a negative training indicator, the negative training indicator comprising at least one background pixel of the digital training image, wherein the at least one background pixel is not part of the target object.

As shown in FIG. 13, the method 1300 also includes an act 1330 of, utilizing the trained neural network and the user indicator, identifying a set of pixels representing the target object. In particular, the act 1300 can includes utilizing the trained neural network and the user indicator, identifying, by the at least one processor, a set of pixels representing the target object in the probe digital image. For example, in one or more embodiments the act 1330 includes generating an object boundary that encompasses the set of pixels representing the target object in the probe digital image. Moreover, in one or more embodiments of the act 1330 the method 1300 identifies the set of pixels representing the target object in the probe digital image based on the comparison between the one or more values of the probability map and the threshold.

In one or more embodiments, the method 1300 also includes generating training indicators by: generating a first negative training indicator comprising a first pixel of a digital training image by randomly sampling the first pixel from a first plurality of pixels that are not part of an identified target object in the digital training image; generating a second negative training indicator comprising a second pixel of the digital training image by randomly sampling the second pixel from a second plurality of pixels that are part of an untargeted object in the digital training image; and/or generating a third negative training indicator comprising a third pixel of the digital training image, by sampling the third pixel from the first plurality of pixels that are not part of the identified target object based on a distance between the third pixel and another negative training indicator.

In addition, in one or more embodiments, the method 1300 also includes identifying a second user indicator with regard to the probe digital image, the second user indicator comprising a second group of one or more pixels from the probe digital image and an indication of how second group of one or more pixels correspond to the target object; and in response to identifying the second user indicator, generating a second set of pixels representing the target object in the probe digital image.

Furthermore, in one or more embodiments of the method 1300, the probe digital image is part of a digital video, the probe digital image is followed sequentially by a second digital image in the digital video, and the second digital image comprises a modified target object corresponding to the target object represented in the probe digital image. Furthermore, the method 1300 can include utilizing the trained neural network, identifying a second set of pixels representing the modified target object in the second digital image based on the identified set of pixels representing the target object in the probe digital image.

As mentioned, FIG. 14 also illustrates a flowchart of a series of acts in a method 1400 of selecting digital objects in accordance with one or more embodiments of the present invention. As shown in FIG. 14, the method 1400 includes an act 1410 of generating training distance maps. In particular, the act 1410 can include generating a plurality of training distance maps with regard to a plurality of digital training images, the plurality of training distance maps reflecting distances between pixels within the plurality of digital training images and training indicators corresponding to target objects within the plurality of digital training images.

Moreover, as illustrated in FIG. 14, the method 1400 also includes an act 1420 of training a neural network based on the distance maps. In particular, the act 1420 can include training a neural network by providing the generated plurality of distance maps to the neural network.

In addition, as shown in FIG. 14, the method 1400 includes an act 1430 of generating a probe distance map with regard to a probe digital image comprising a target image. In particular, the act 1430 can include generating a probe distance map with regard to a probe digital image, the probe distance map reflecting distances between pixels in the probe digital image and a user indicator within the probe digital image, wherein the user indicator comprises one or more pixels representing a target object in the probe digital image.

As illustrated in FIG. 14, the method 1430 also includes an act 1440 of utilizing the probe distance map and the trained neural network, identifying a set of pixels representing the target object. In particular, the act 1440 can include utilizing the probe distance map and the trained neural network, identifying a set of pixels representing the target object in the probe digital image. For example, in one or more embodiments, the act 1440 includes providing the trained neural network with the probe distance map and the probe negative distance map; and utilizing the trained neural network, generating a probability map, the probability map reflecting a likelihood that the set of pixels represent the target object in the probe digital image.

In one or more embodiments, the method 1400 also includes generating a probe negative distance map, the probe negative distance map reflecting distances between pixels in the probe digital image and a second user indicator within the probe digital image, wherein the second user indicator comprises a second group of one or more pixels in the probe digital image that do not represent the target object in the probe digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
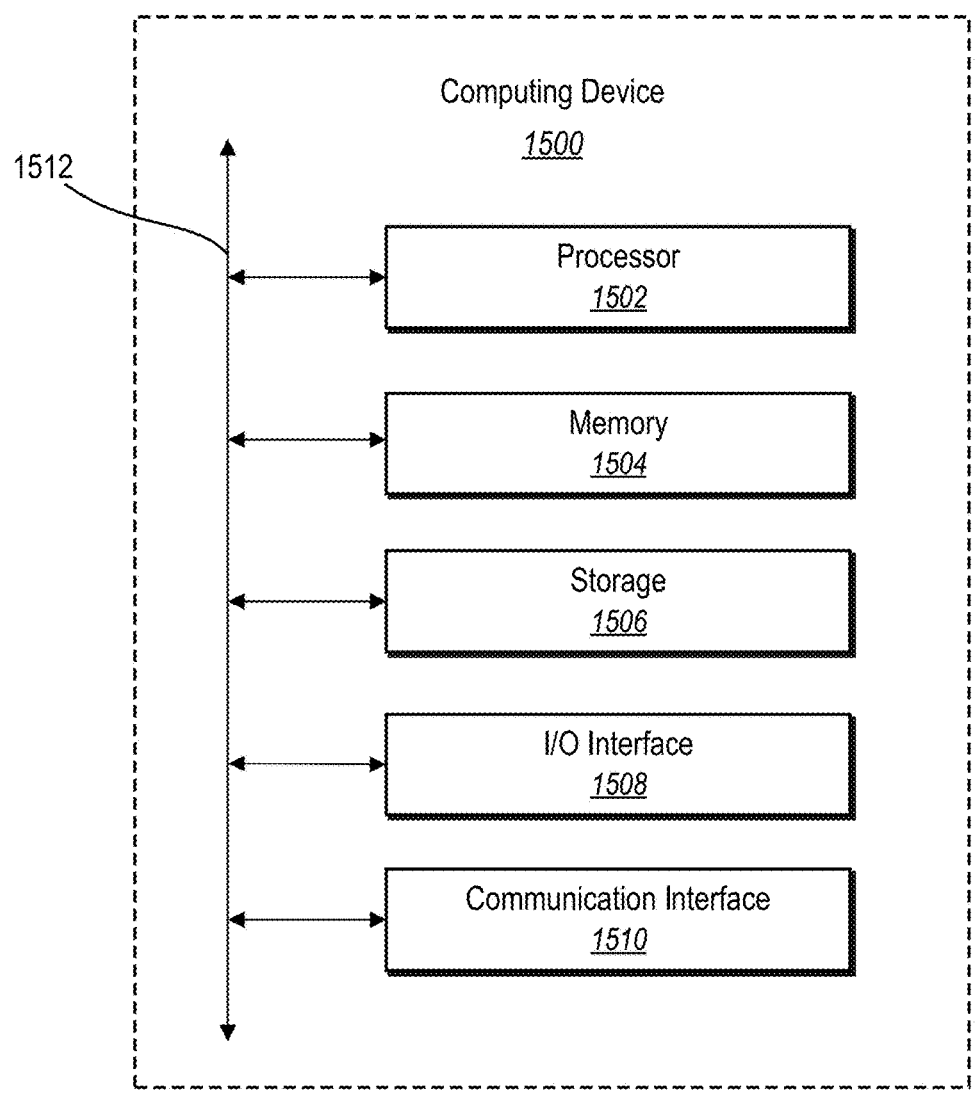
FIG. 15 illustrates a block diagram of an exemplary computing device in accordance with one or more embodiments.

FIG. 15 illustrates, in block diagram form, an exemplary computing device 1500 that may be configured to perform one or more of the processes described above. One will appreciate that the digital selection system 100 can comprise implementations of the computing device 1500. As shown by FIG. 15, the computing device can comprise a processor 1502, memory 1504, a storage device 1506, an I/O interface 1508, and a communication interface 1510. While an exemplary computing device 1500 is shown in FIG. 15, the components illustrated in FIG. 15 are not intended to be limiting. Additional or alternative components may be used in other embodiments. Furthermore, in certain embodiments, a computing device 1500 can include fewer components than those shown in FIG. 15. Components of computing device 1500 shown in FIG. 15 will now be described in additional detail.

In particular embodiments, processor(s) 1502 includes hardware for executing instructions, such as those making up a computer program. As an example and not by way of limitation, to execute instructions, processor(s) 1502 may retrieve (or fetch) the instructions from an internal register, an internal cache, memory 1504, or a storage device 1506 and decode and execute them. In particular embodiments, processor(s) 1502 may include one or more internal caches for data, instructions, or addresses. As an example and not by way of limitation, processor(s) 1502 may include one or more instruction caches, one or more data caches, and one or more translation lookaside buffers (TLBs). Instructions in the instruction caches may be copies of instructions in memory 1504 or storage 1506.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1504 may be internal or distributed memory.

The computing device 1500 includes a storage device 1506 includes storage for storing data or instructions. As an example and not by way of limitation, storage device 1506 can comprise a non-transitory storage medium described above. The storage device 1506 may include a hard disk drive (HDD), a floppy disk drive, flash memory, an optical disc, a magneto-optical disc, magnetic tape, or a Universal Serial Bus (USB) drive or a combination of two or more of these. Storage device 1506 may include removable or non-removable (or fixed) media, where appropriate. Storage device 1506 may be internal or external to the computing device 1500. In particular embodiments, storage device 1506 is non-volatile, solid-state memory. In particular embodiments, storage device 1506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1500 also includes one or more input or output ("I/O") devices/interfaces 1508, which are provided to allow a user to provide input to (such as user strokes), receive output from, and otherwise transfer data to and from the computing device 1500. These I/O devices/interfaces 1508 may include a mouse, keypad or a keyboard, a touch screen, camera, optical scanner, network interface, modem, other known I/O devices or a combination of such I/O devices/interfaces 1508. The touch screen may be activated with a stylus or a finger.

The I/O devices/interfaces 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1508 is configured to provide graphical data to a display for presentation to a user. The graphical data may be representative of one or more graphical user interfaces and/or any other graphical content as may serve a particular implementation.

The computing device 1500 can further include a communication interface 1510. The communication interface 1510 can include hardware, software, or both. The communication interface 1510 can provide one or more interfaces for communication (such as, for example, packet-based communication) between the computing device and one or more other computing devices 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1510. As an example and not by way of limitation, computing device 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1500 may include any suitable communication interface 1510 for any of these networks, where appropriate.

The computing device 1500 can further include a bus 1512. The bus 1512 can comprise hardware, software, or both that couples components of computing device 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for editing digital visual media, a method of interactively selecting digital objects represented within digital visual media using deep learning, the method comprising:
   accessing a neural network trained utilizing a repository of digital training images having target objects, training ground truth masks of the target objects, training indicators, and training distance maps, each training distance map reflecting distances between a corresponding training indicator and pixels of a corresponding digital training image;
   identifying a user indicator with regard to a probe digital image, the user indicator comprising one or more pixels of the probe digital image identified by a user and an indication of how the one or more pixels correspond to a target object represented in the probe digital image;
   generating a distance map reflecting distances between the user indicator and pixels of the probe digital image; and
   identifying a set of pixels representing the target object in the probe digital image by providing the probe digital image, the user indicator, and the generated distance map as input to the trained neural network.

2. The method of claim 1, wherein identifying the set of pixels representing the target object in the probe digital image further comprises generating a probability map by utilizing the trained neural network based on the user indicator, the probability map comprising values that reflect a likelihood that the set of pixels correspond to the target object.

3. The method of claim 2, further comprising, comparing the values of the probability map to a threshold, wherein the method identifies the set of pixels representing the target object in the probe digital image based on the comparison.

4. The method of claim 1, wherein:
   the user indicator comprises one or more of: user input of a point corresponding to a pixel, user input of a stroke corresponding to a plurality of pixels, user input of a bounding box encompassing a plurality of pixels, or user input of a boundary corresponding to a plurality of pixels; and
   the user indicator comprises the indication of how the one or more pixels correspond to the target object in the probe digital image, the indication comprising one or more of: an indication that the target object in the probe digital image is encompassed by the one or more pixels, an indication that the one or more pixels are within the target object in the probe digital image, an indication that the one or more pixels are outside the target object in the probe digital image, or an indication that the one or more pixels are near the target object in the probe digital image.

5. The method of claim 1, wherein the training indicators comprise:
   a positive training indicator, the positive training indicator comprising at least one pixel of a digital training image, wherein the digital training image comprises an identified target object, and the at least one pixel is part of the identified target object; and
   a negative training indicator, the negative training indicator comprising at least one background pixel of the digital training image, wherein the at least one background pixel is not part of the identified target object.

6. The method of claim 1, further comprising generating the training indicators by:
   generating a first negative training indicator comprising a first pixel of a digital training image by randomly sampling the first pixel from a first plurality of pixels that are not part of an identified target object in the digital training image;
   generating a second negative training indicator comprising a second pixel of the digital training image by randomly sampling the second pixel from a second plurality of pixels that are part of an untargeted object in the digital training image; or
   generating a third negative training indicator comprising a third pixel of the digital training image, by sampling the third pixel from the first plurality of pixels that are not part of the identified target object based on a distance between the third pixel and another negative training indicator.

7. The method of claim 1, further comprising generating a training distance map for a digital training image from the repository of digital training images, wherein the digital training image comprises an identified target object, wherein a training indicator comprises an indicated pixel of the digital training image, and wherein the training distance map comprises distances between pixels in the digital training image and the indicated pixel.

8. The method of claim 5, further comprising providing the neural network with a positive training distance map, a negative training distance map, and a color channel, wherein the positive training distance map reflects a distance between a pixel in a digital training image and a positive training indicator, the negative training distance map reflects a distance between a pixel in the digital training image and a negative training indicator, and the color channel reflects a color of a pixel in the digital training image.

9. The method of claim 1, further comprising:
identifying a second user indicator with regard to the probe digital image, the second user indicator comprising a second group of one or more pixels from the probe digital image identified by the user;
generating a second distance map reflecting distances between the second user indicator and the pixels of the probe digital image; and
generating a second set of pixels representing the target object in the probe digital image based on the second distance map.

10. The method of claim 1, wherein the probe digital image is part of a digital video, wherein the probe digital image is followed sequentially by a second digital image in the digital video, wherein the second digital image comprises a modified target object corresponding to the target object represented in the probe digital image, and the method further comprising: utilizing the trained neural network, identifying a second set of pixels representing the modified target object in the second digital image based on the identified set of pixels representing the target object in the probe digital image.

11. A non-transitory computer readable medium storing instructions that, when executed by at least one processor, cause a computer system to:
access a neural network trained utilizing digital training images having target objects, training ground truth masks of the target objects, training indicators, and training distance maps, each training distance map reflecting distances between a corresponding training indicator and pixels of a corresponding digital training image;
identify a user indicator with regard to a probe digital image, the user indicator comprising one or more pixels of the probe digital image identified by a user and an indication of how the one or more pixels correspond to a target object represented in the probe digital image;
generate a distance map reflecting distances between the user indicator and pixels of the probe digital image; and
identify a set of pixels representing the target object in the probe digital image by providing the probe digital image, the user indicator, and the generated distance map as input to the trained neural network.

12. The non-transitory computer readable medium of claim 11, wherein:
the user indicator comprises a positive user indicator comprising at least one pixel that is part of the target object; and
the distance map reflects distances between the at least one pixel that is part of the target object and pixels of the probe digital image.

13. The non-transitory computer readable medium of claim 12, further comprising instructions that, when executed by the at least one processor, cause the computer system to:
identify a second user indicator with regard to the probe digital image; and
in response to identifying the second user indicator:
generate a second distance map reflecting distances between the second user indicator and the pixels of the probe digital image; and
generate a second set of pixels representing the target object in the probe digital image by providing the second distance map as input to the trained neural network.

14. The non-transitory computer readable medium of claim 11, wherein:
the user indicator comprises a negative user indicator comprising at least one pixel that is not part of the target object; and
the distance map reflects distances between the at least one pixel that is not part of the target object and pixels of the probe digital image.

15. The non-transitory computer readable medium of claim 11, wherein:
the training indicators comprise a positive training indicator and a negative training indicator; and
the training distance maps comprise a first distance map reflecting distances between the positive training indicator and pixels of a first digital training image and a second distance map reflecting distances between the negative training indicator and pixels of a second digital training image.

16. A system comprising:
at least one processor; and
at least one non-transitory computer readable storage medium storing instructions that, when executed by the at least one processor, cause the system to:
access a neural network trained utilizing a repository of digital training images having target objects, training ground truth masks of the target objects, training indicators, and training distance maps, each training distance map reflecting distances between a corresponding training indicator and pixels of a corresponding digital training image;
identify a user indicator with regard to a probe digital image, the user indicator comprising one or more pixels of the probe digital image identified by a user and an indication of how the one or more pixels correspond to a target object represented in the probe digital image;
generate a distance map reflecting distances between the user indicator and pixels of the probe digital image; and
identify a set of pixels representing the target object in the probe digital image by providing the probe digital image, the user indicator, and the generated distance map as input to the trained neural network.

17. The system of claim 16, further comprising instructions that, when executed by the at least one processor, cause the system to:
identify the set of pixels representing the target object in the probe digital image by generating a probability map by utilizing the trained neural network based on the user indicator, the probability map comprising values that reflect a likelihood that the set of pixels correspond to the target object;

compare the values of the probability map to a threshold; and identify the set of pixels representing the target object in the probe digital image based on the comparison.

18. The system of claim 16, wherein:

the user indicator comprises one or more of: user input of a point corresponding to a pixel, user input of a stroke corresponding to a plurality of pixels, user input of a bounding box encompassing a plurality of pixels, or user input of a boundary corresponding to a plurality of pixels; and the user indicator comprises the indication of how the one or more pixels correspond to the target object in the probe digital image, the indication comprising one or more of: an indication that the target object in the probe digital image is encompassed by the one or more pixels, an indication that the one or more pixels are within the target object in the probe digital image, an indication that the one or more pixels are outside the target object in the probe digital image, or an indication that the one or more pixels are near the target object in the probe digital image.

19. The system of claim 16, wherein the training indicators comprise:

a positive training indicator, the positive training indicator comprising at least one pixel of a digital training image, wherein the digital training image comprises an identified target object, and the at least one pixel is part of the identified target object; and a negative training indicator, the negative training indicator comprising at least one background pixel of the digital training image, wherein the at least one background pixel is not part of the identified target object.

20. The system of claim 16, further comprising instructions that, when executed by the at least one processor, cause the system to:

identify a second user indicator with regard to the probe digital image, the second user indicator comprising a second group of one or more pixels from the probe digital image identified by the user;

generate a second distance map reflecting distances between the second user indicator and the pixels of the probe digital image; and generate a second set of pixels representing the target object in the probe digital image based on the second distance map.

* * * * *